United States Patent
Simon et al.

(10) Patent No.: US 11,339,869 B2
(45) Date of Patent: May 24, 2022

(54) LUBRICATING AND COOLING CORE FOR A MECHANICAL REDUCTION GEAR OF AN AIRCRAFT TURBINE ENGINE

(71) Applicant: SAFRAN TRANSMISSION SYSTEMS, Colombes (FR)

(72) Inventors: Adrien Louis Simon, Moissy-Cramayel (FR); Jean-Charles Michel Pierre Di Giovanni, Moissy-Cramayel (FR); Boris Pierre Marcel Morelli, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 328 days.

(21) Appl. No.: 16/691,412

(22) Filed: Nov. 21, 2019

(65) Prior Publication Data
US 2020/0166117 A1 May 28, 2020

(30) Foreign Application Priority Data
Nov. 23, 2018 (FR) ...................................... 1871749

(51) Int. Cl.
*F16H 57/04* (2010.01)
*F02C 7/06* (2006.01)
(Continued)

(52) U.S. Cl.
CPC ........... *F16H 57/0427* (2013.01); *F02C 7/06* (2013.01); *F02C 7/16* (2013.01); *F16H 57/0456* (2013.01);
(Continued)

(58) Field of Classification Search
None
See application file for complete search history.

(56) References Cited

U.S. PATENT DOCUMENTS

| 8,820,478 B2 | 9/2014 | Gauthier et al. |
| 8,876,647 B2 | 11/2014 | Gallet et al. |
| (Continued) | | |

FOREIGN PATENT DOCUMENTS

| EP | 2 333 250 A2 | 6/2011 |
| EP | 2 333 250 A3 | 3/2014 |
| (Continued) | | |

OTHER PUBLICATIONS

French Search Report and Written Opinion dated Jul. 23, 2019, for French Application No. 1871749, filed Nov. 23, 2018, 9 pages.

*Primary Examiner* — Dirk Wright
(74) *Attorney, Agent, or Firm* — Christensen O'Connor Johnson Kindness PLLC

(57) ABSTRACT

A lubricating and cooling core for a mechanical reduction gear of a turbine engine, for example of an aircraft, is configured to be mounted in an axis of a planet gear of the reduction gear. The core includes first and second coaxial and substantially frusto-conical shields, each having a first end with a greater diameter and a second opposite end with a smaller diameter, the shields being secured to one another by their second ends and being configured to extend inside the axis and to cover at least a radially internal surface of the axis to define with the latter at least one annular cavity for the circulation of oil for lubricating and cooling the axis, the second ends of the first and second shields having fluid connection means configured to connect the at least one cavity to a source of lubricating and cooling oil.

10 Claims, 23 Drawing Sheets

(51) Int. Cl.
*F02C 7/16* (2006.01)
*F16H 57/08* (2006.01)
*F16H 1/36* (2006.01)

(52) U.S. Cl.
CPC ..... *F16H 57/0471* (2013.01); *F16H 57/0486* (2013.01); *F16H 57/08* (2013.01); *F05D 2220/32* (2013.01); *F05D 2260/98* (2013.01); *F16H 1/36* (2013.01); *F16H 2057/085* (2013.01)

(56) References Cited

U.S. PATENT DOCUMENTS

| | | | |
|---|---|---|---|
| 9,523,424 B2 * | 12/2016 | Altamura | F16H 57/046 |
| 9,797,475 B2 * | 10/2017 | Altamura | F16H 1/2836 |
| 10,458,279 B2 | 10/2019 | Gedin et al. | |
| 10,844,905 B2 * | 11/2020 | Meyer | F16H 57/043 |
| 2019/0162294 A1 | 5/2019 | Nique et al. | |
| 2019/0203768 A1 | 7/2019 | Meyer | |

FOREIGN PATENT DOCUMENTS

| | | |
|---|---|---|
| EP | 3 290 751 A1 | 3/2018 |
| EP | 3 333 459 A1 | 6/2018 |
| EP | 3 489 550 A1 | 5/2019 |
| FR | 1357038 A | 4/1964 |
| FR | 2 987 416 A1 | 8/2013 |
| FR | 3 041 054 A1 | 3/2017 |
| WO | 2010/092263 A1 | 8/2010 |

* cited by examiner

[Fig.1]
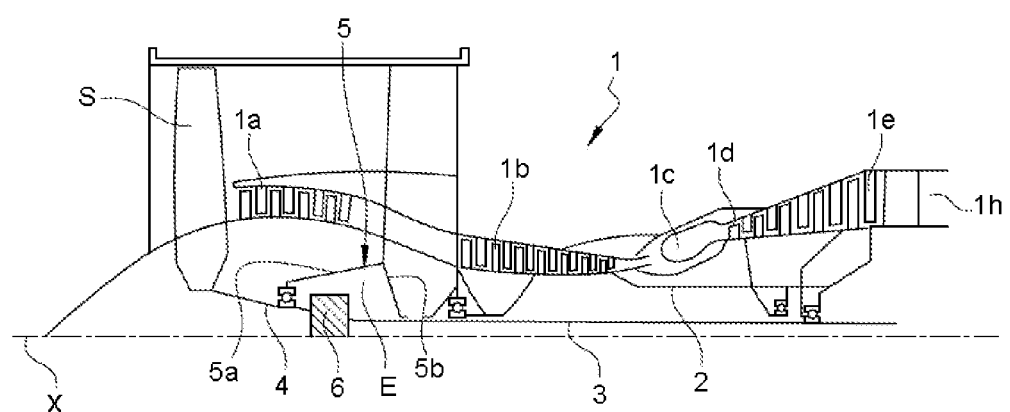

[Fig.2]
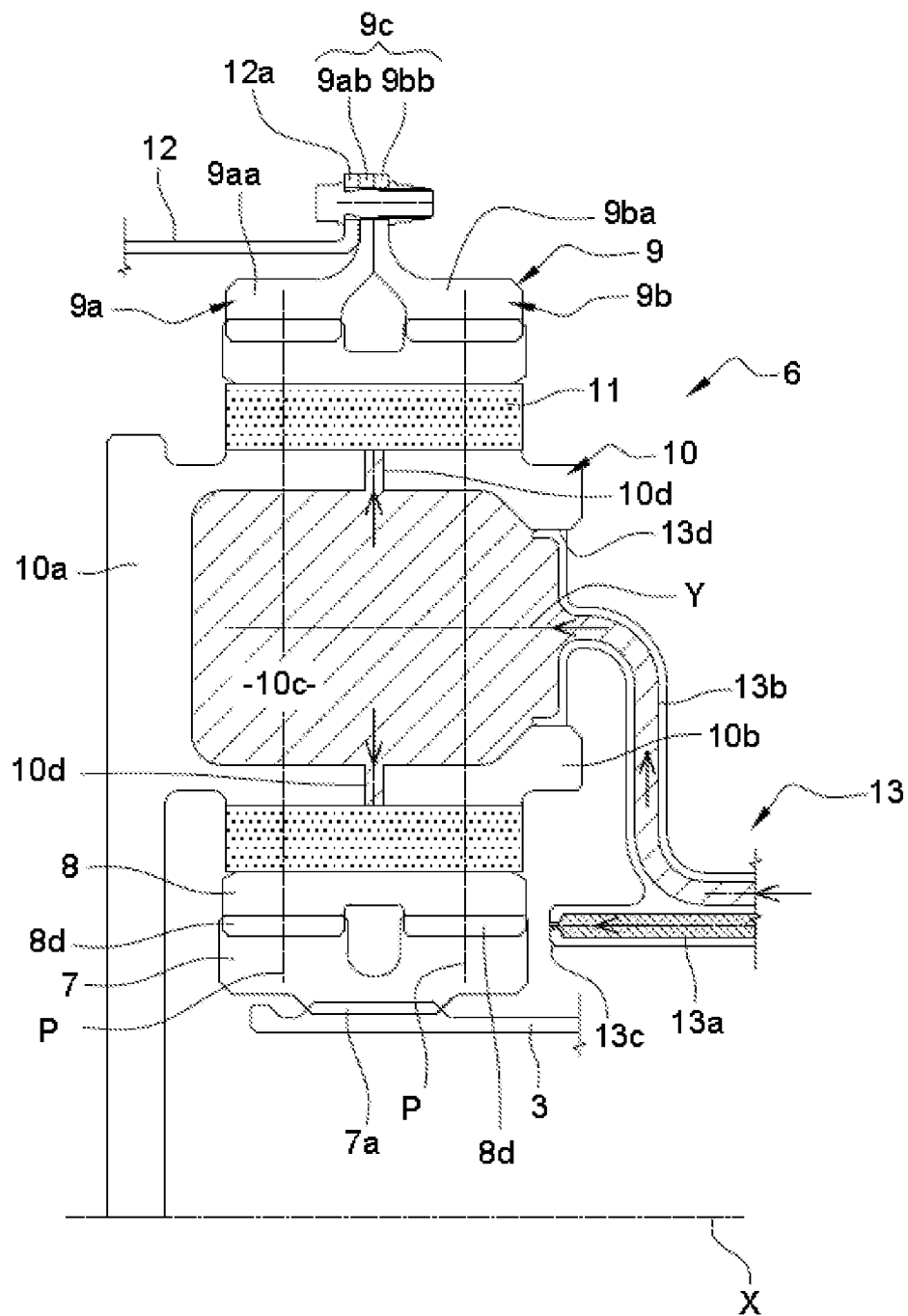

[Fig.3]
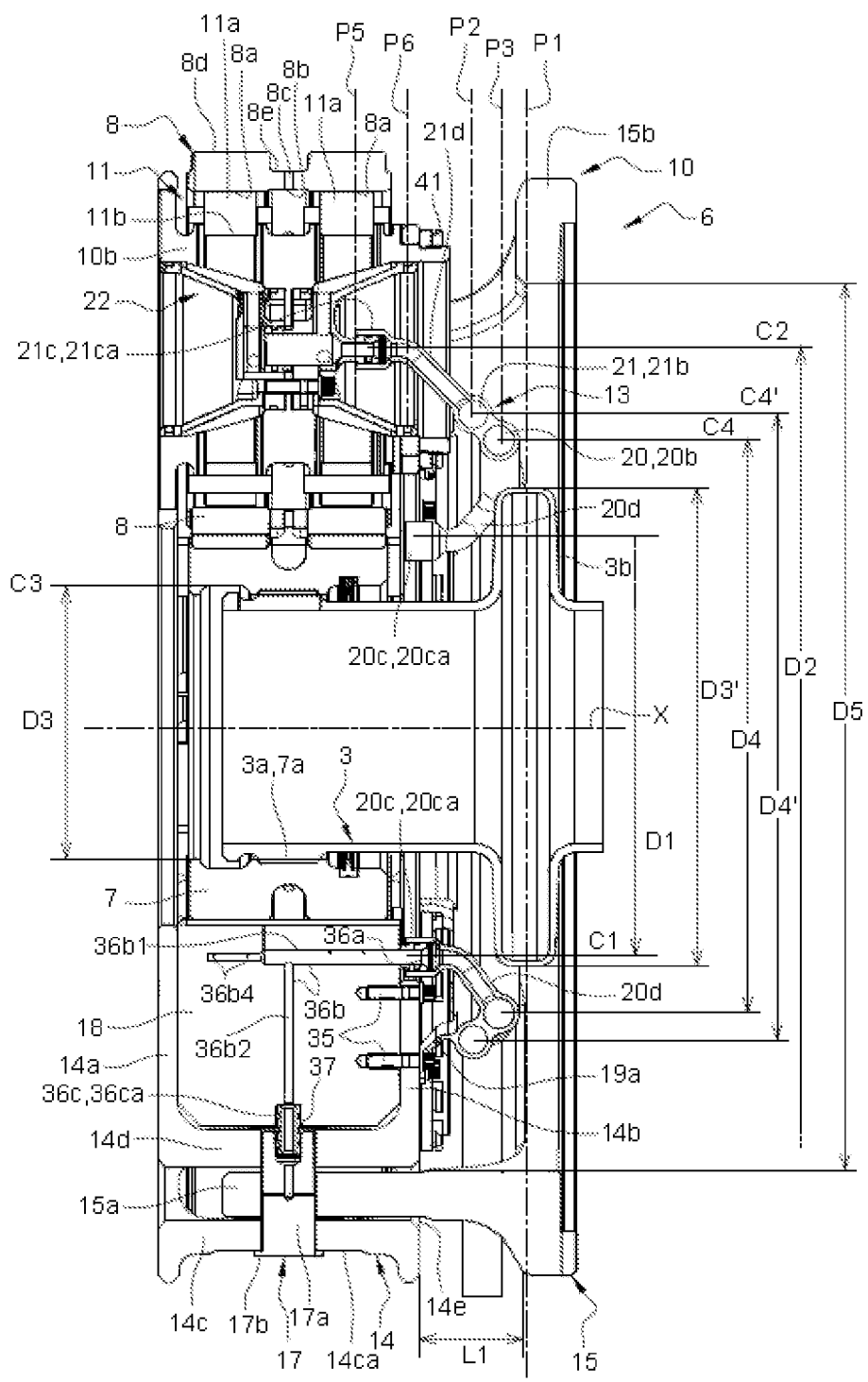

[Fig.4]
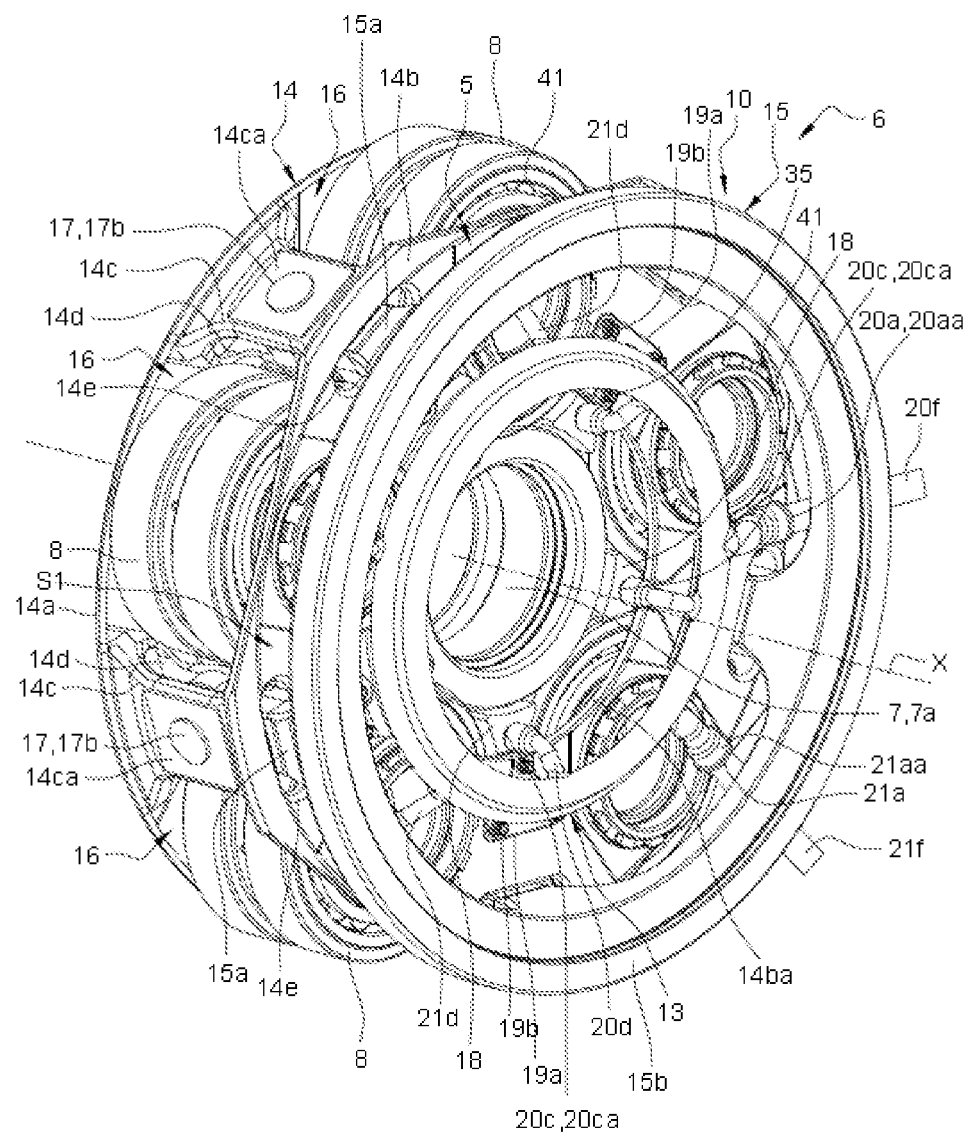

[Fig.5]
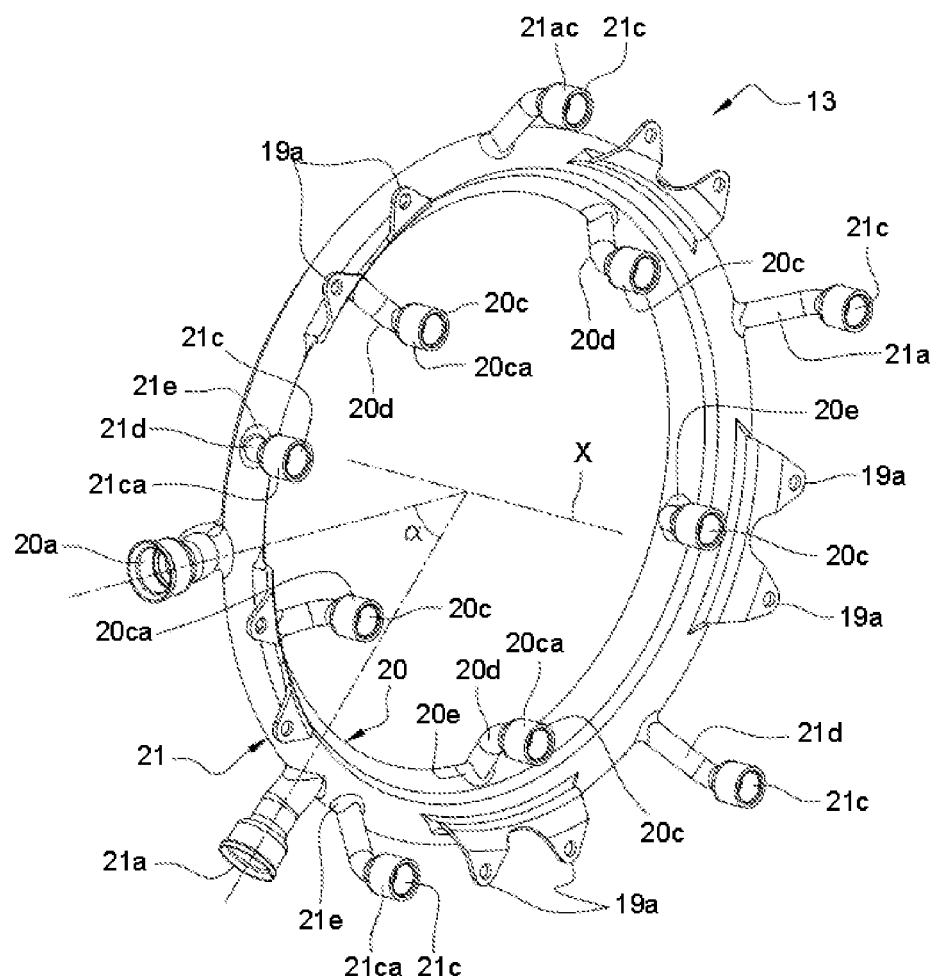

[Fig.6]
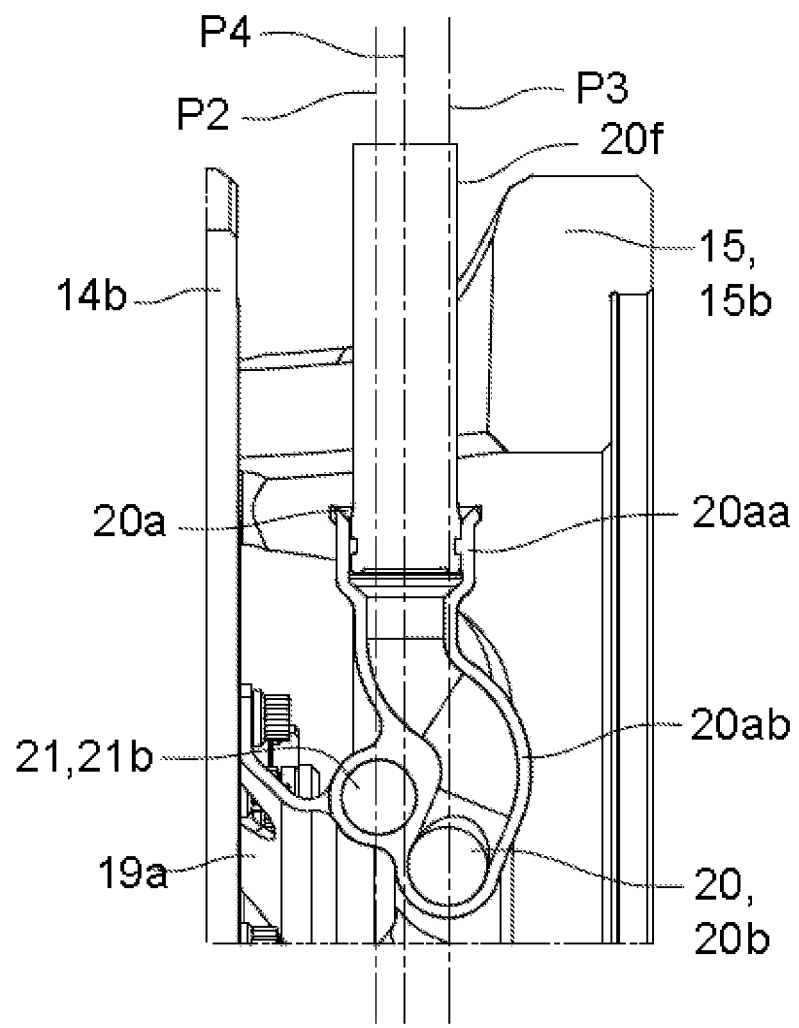

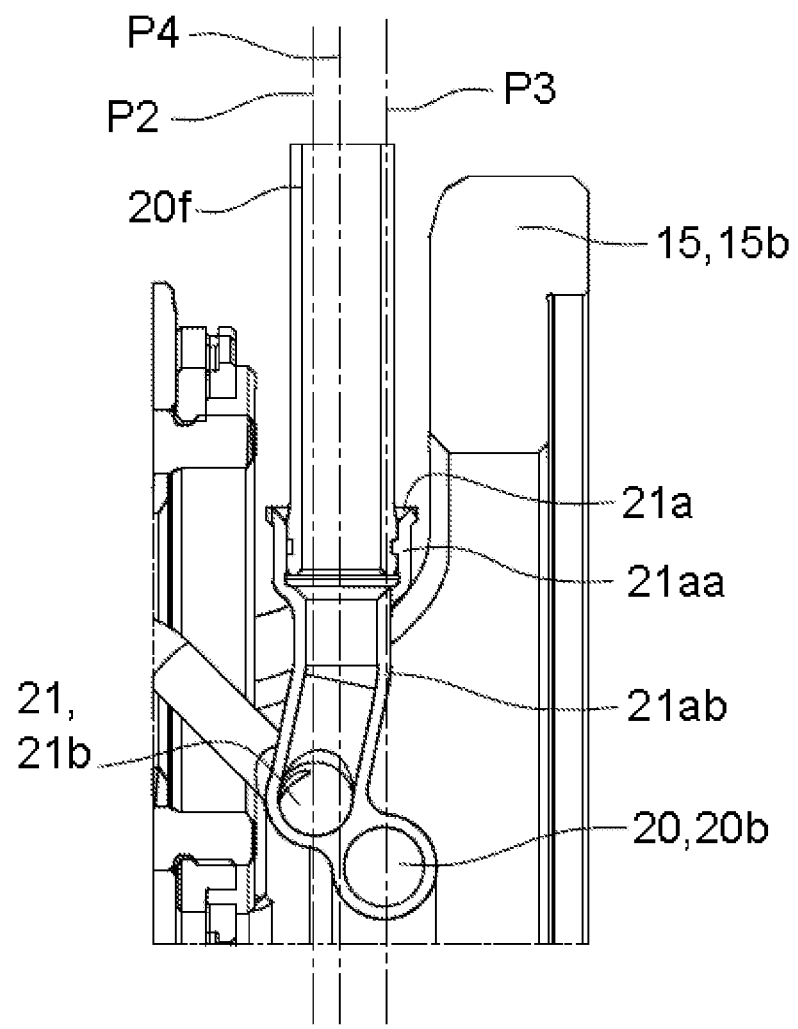
[Fig.7]

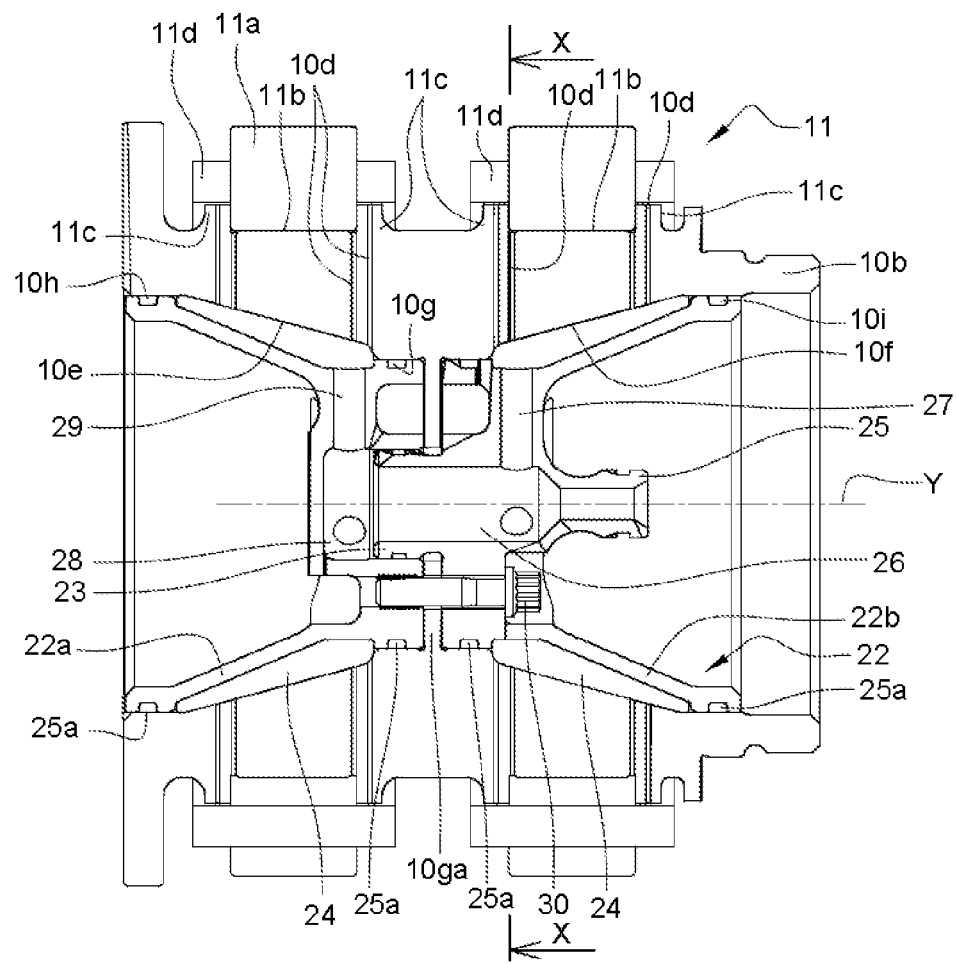
[Fig.8]

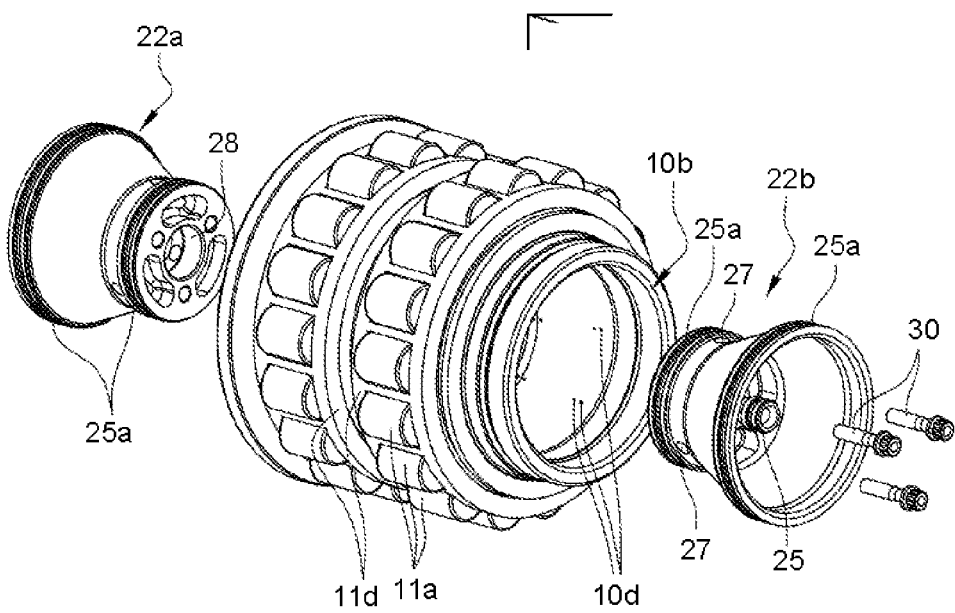
[Fig.9]

[Fig.10]
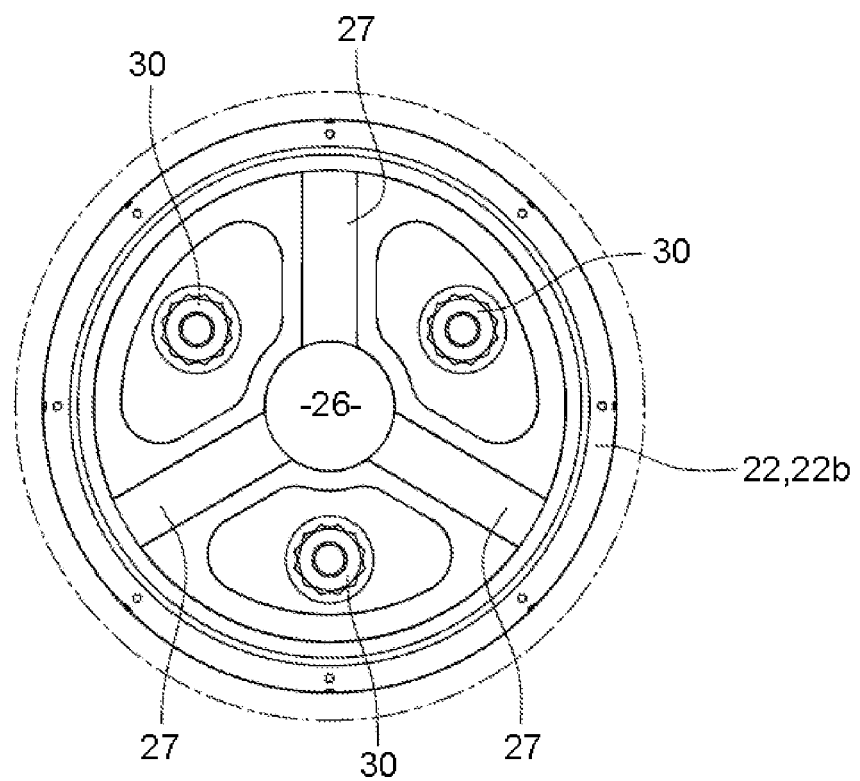

[Fig.11]
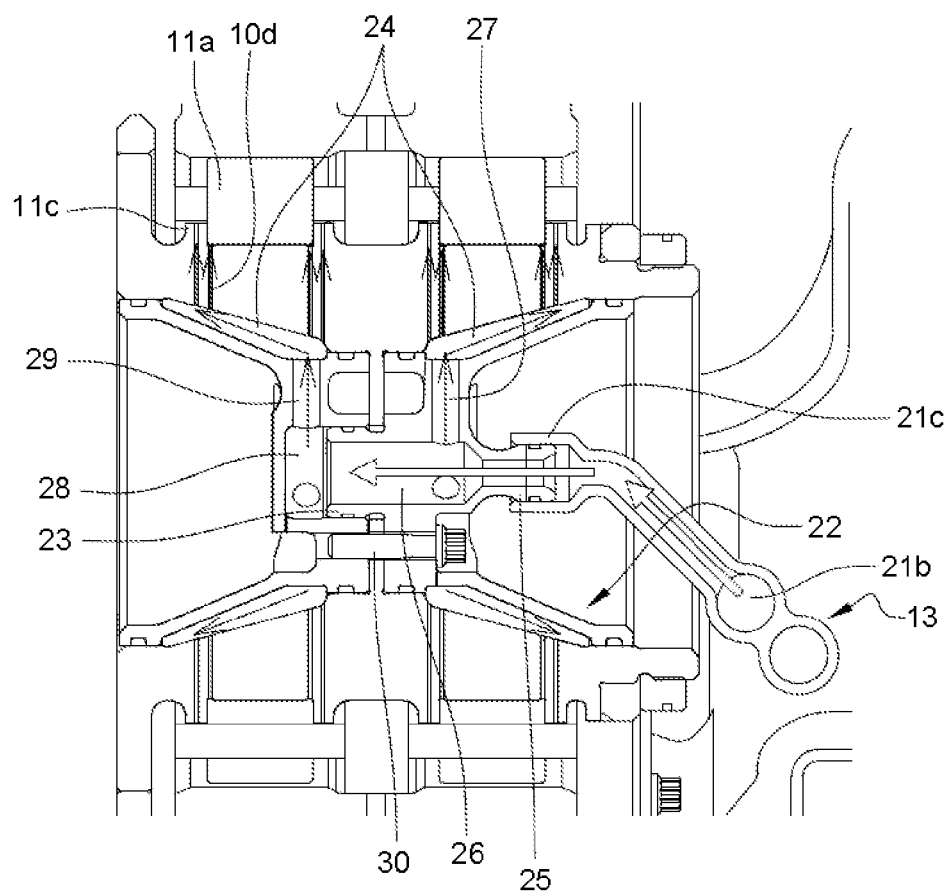

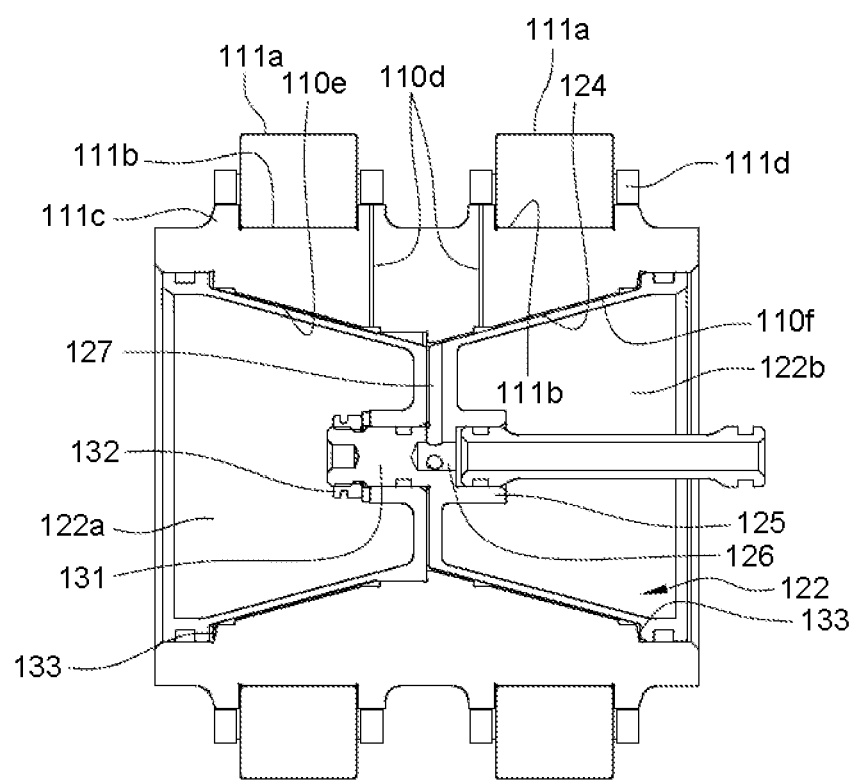
[Fig.12]

[Fig.13]
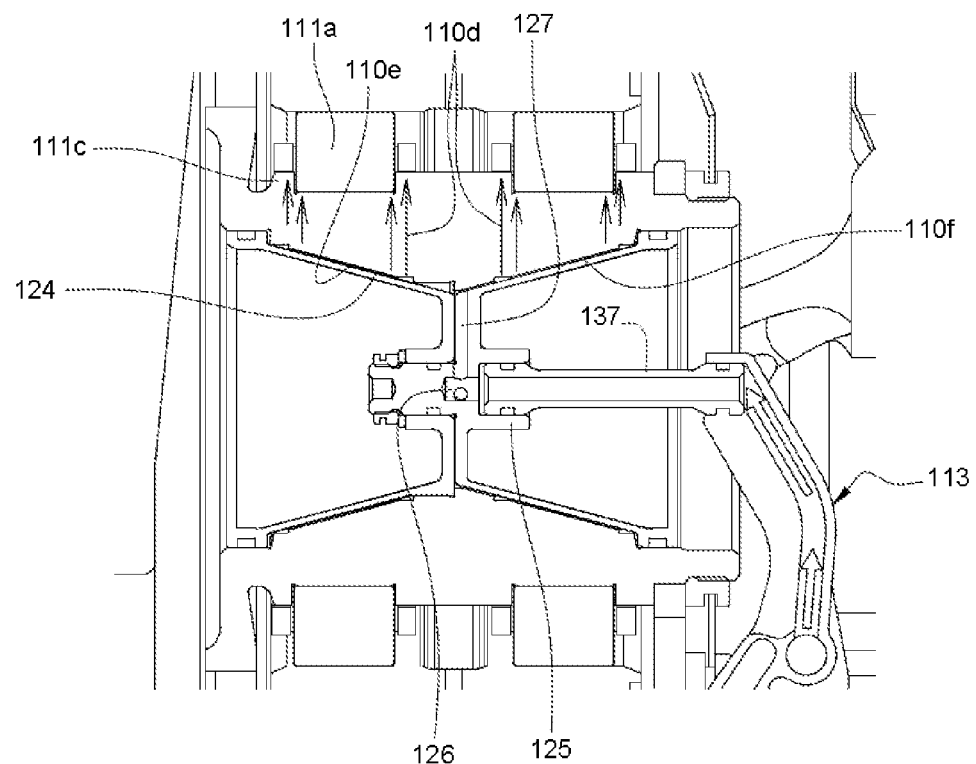

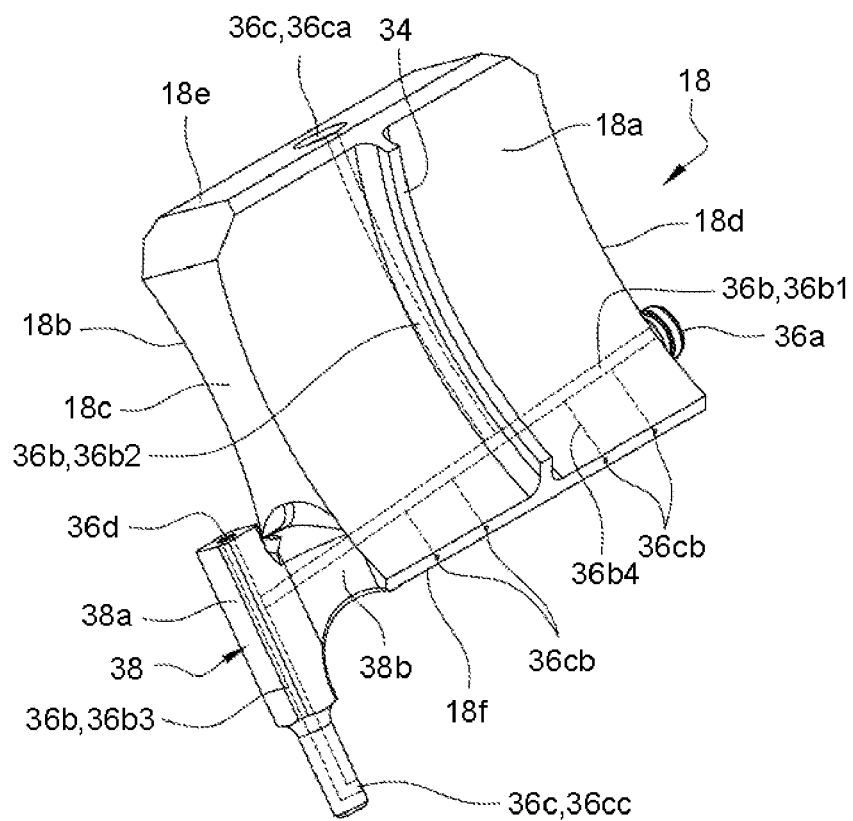
[Fig.14a]

[Fig.14b]
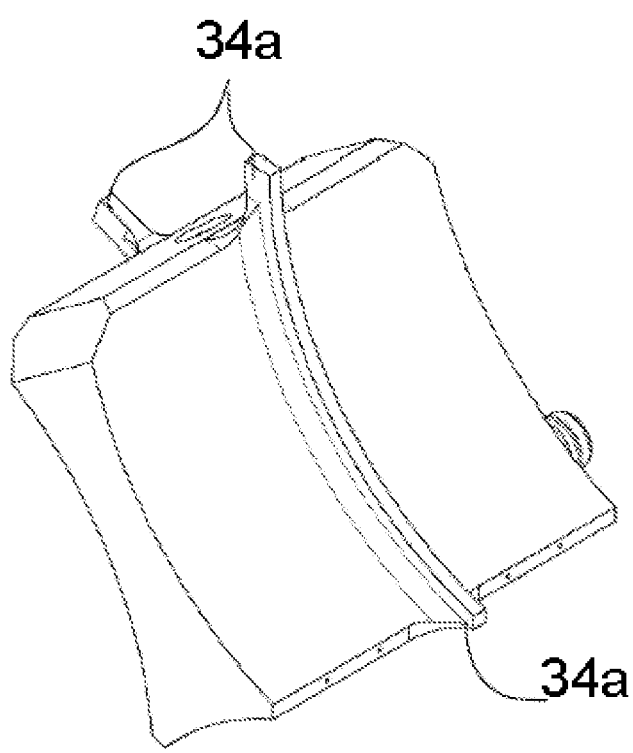

[Fig.15]
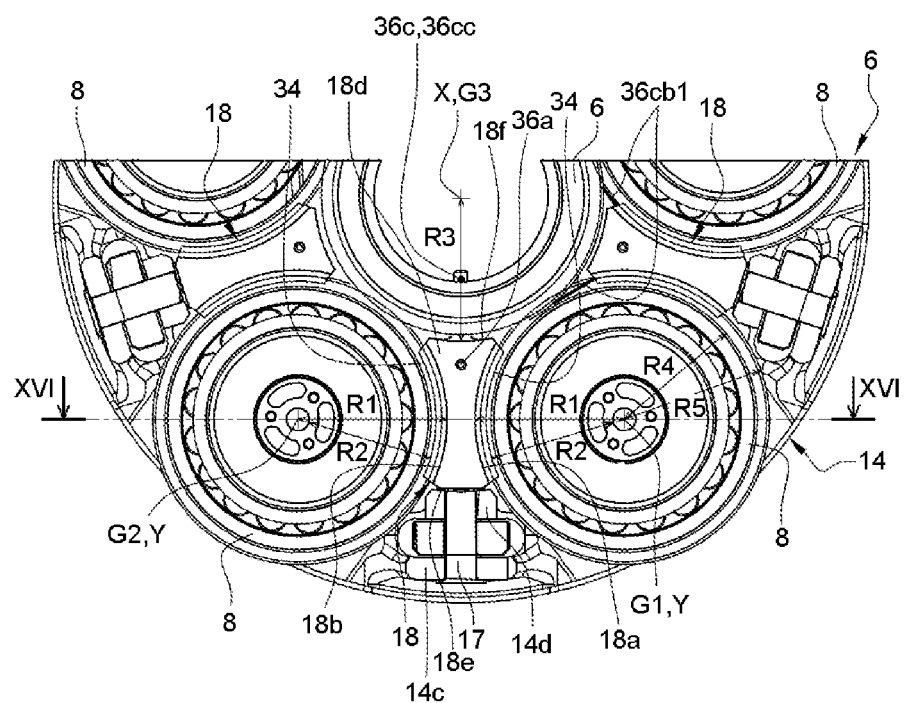

[Fig. 16]
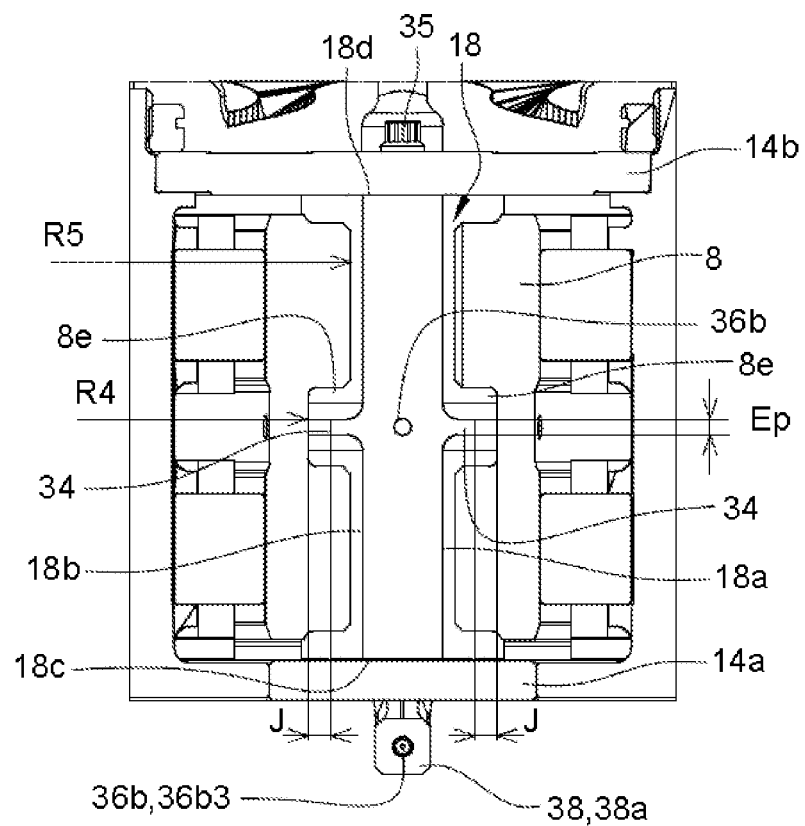

[Fig.17]
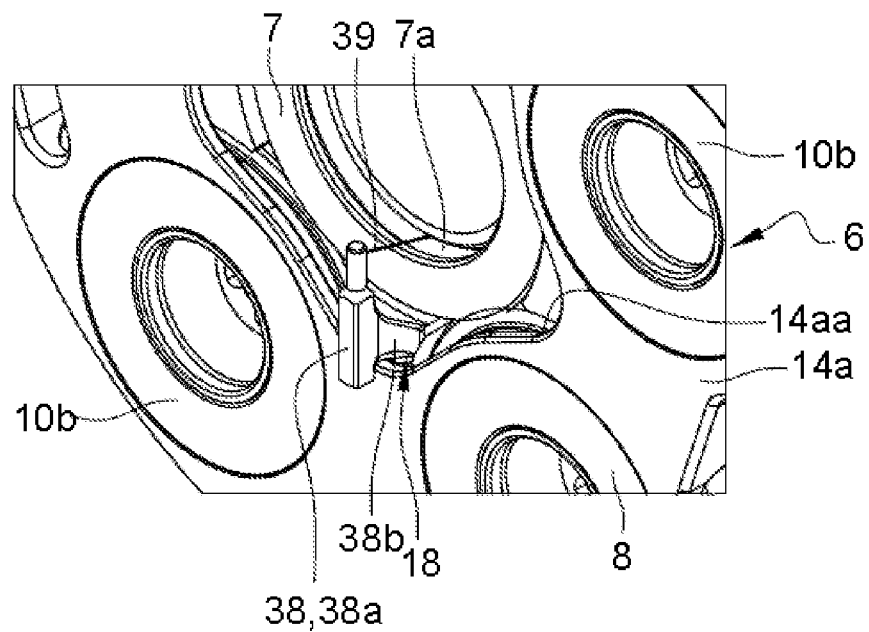

[Fig.18]
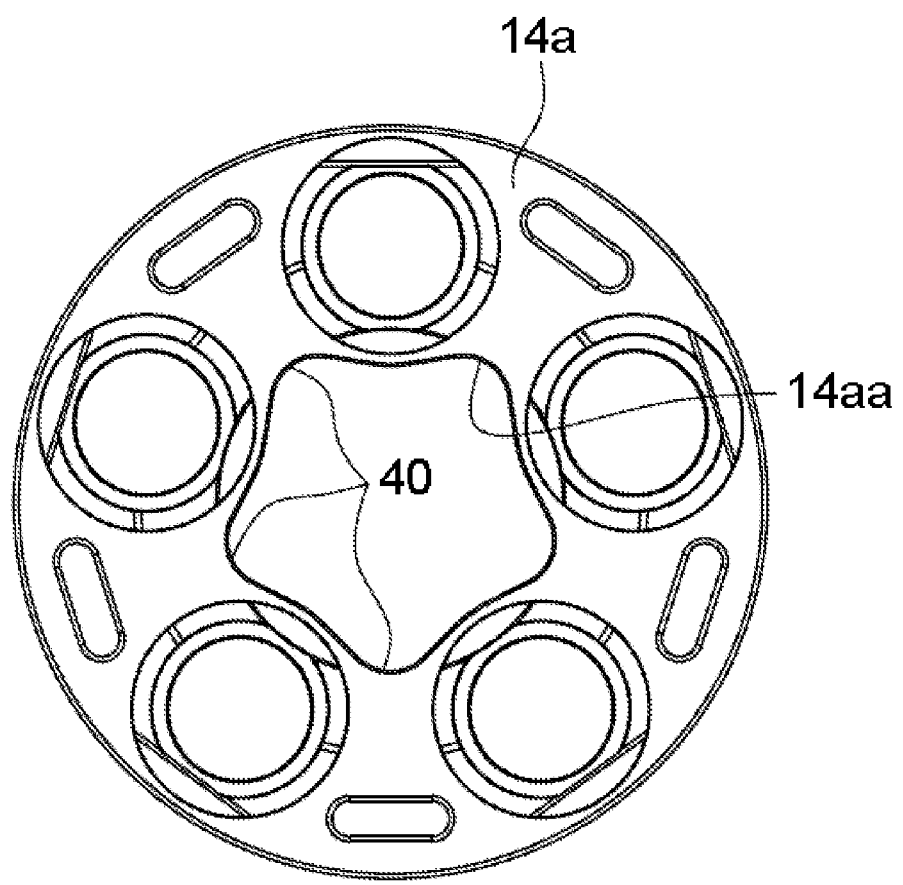

[Fig.19]
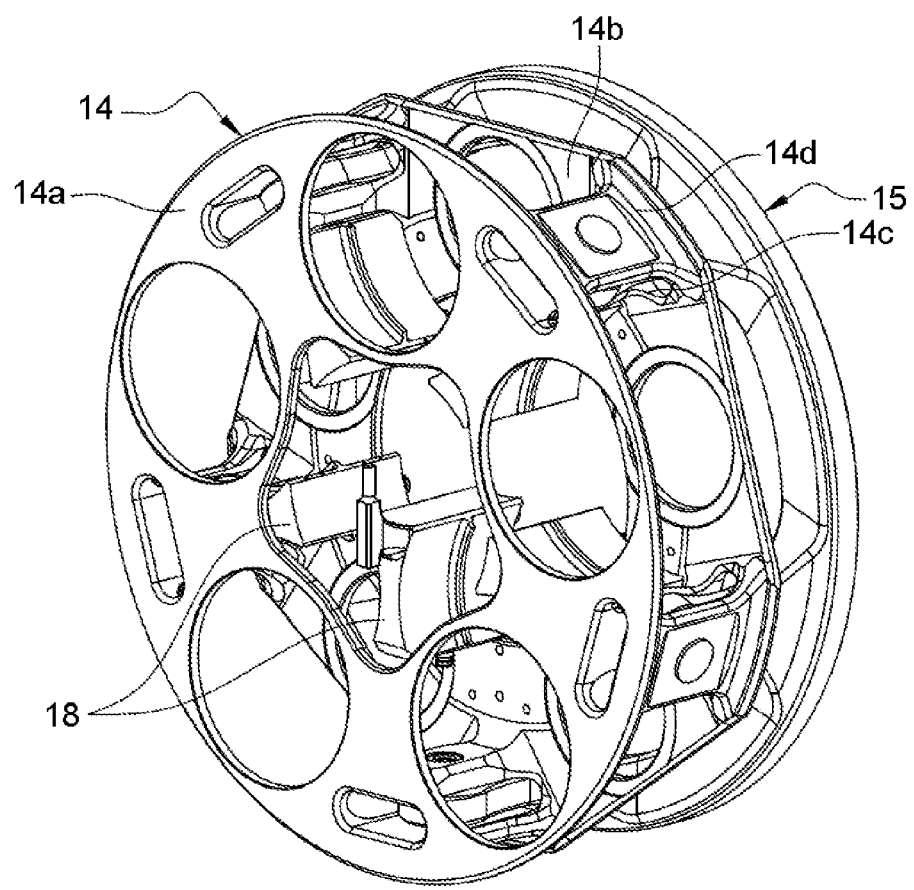

[Fig.20]
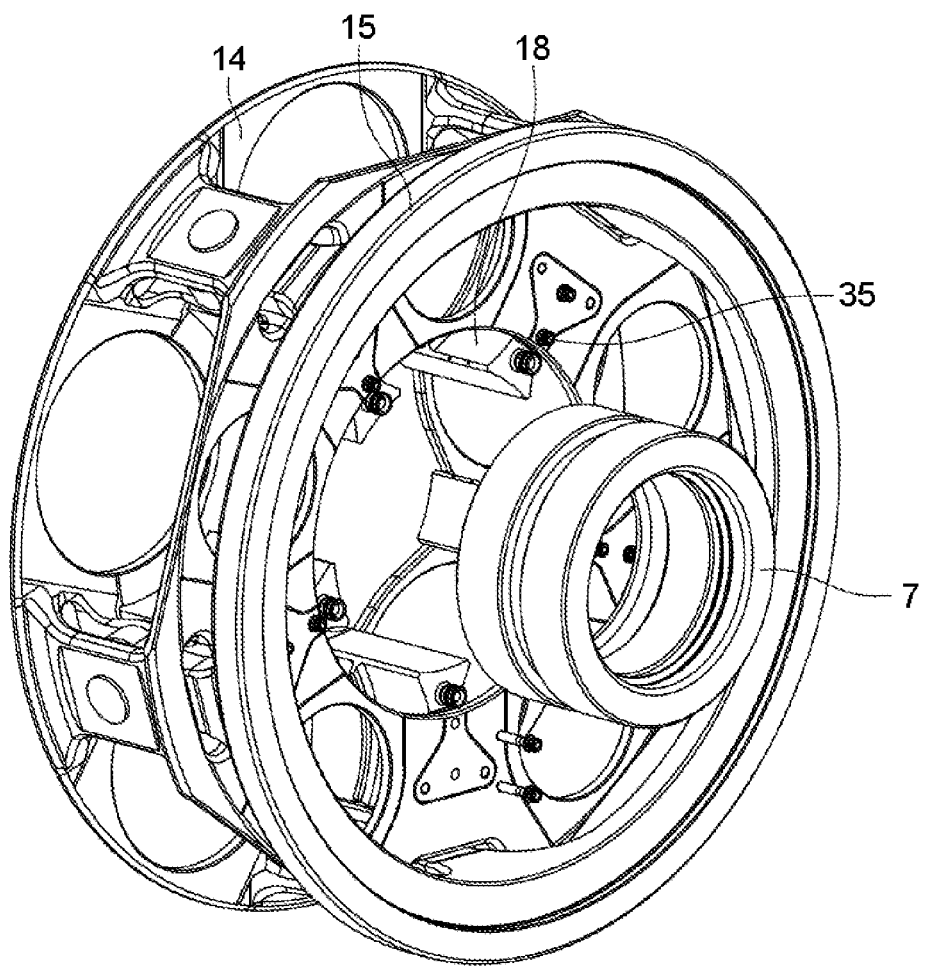

[Fig.21]
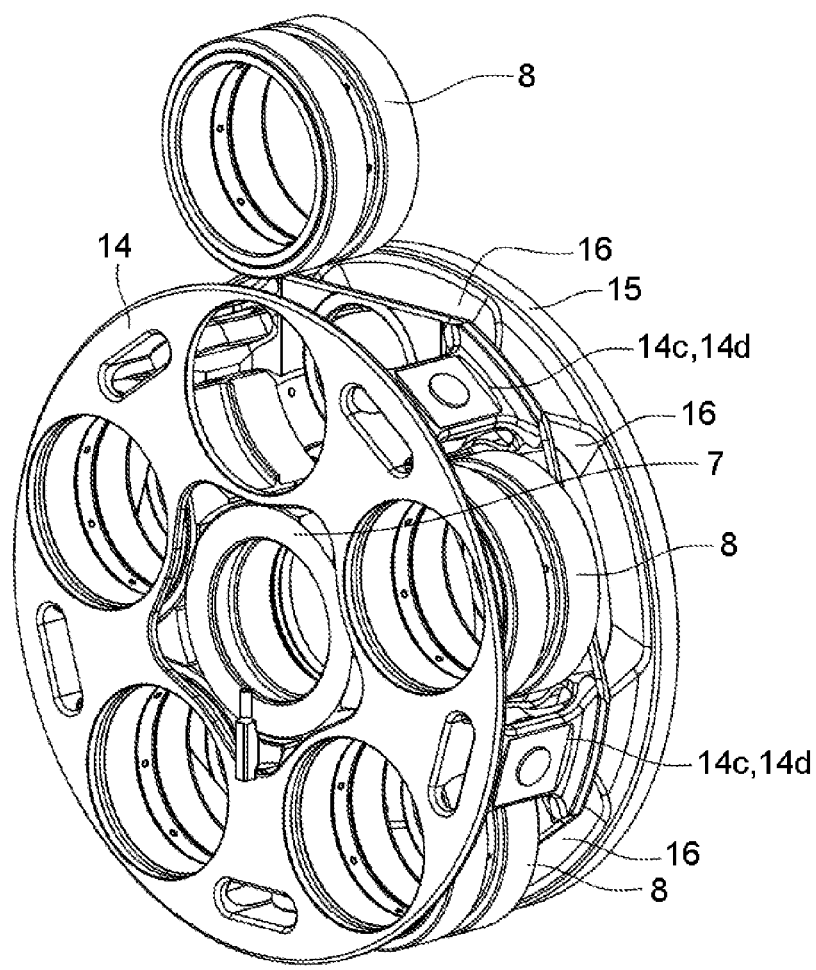

[Fig.22]
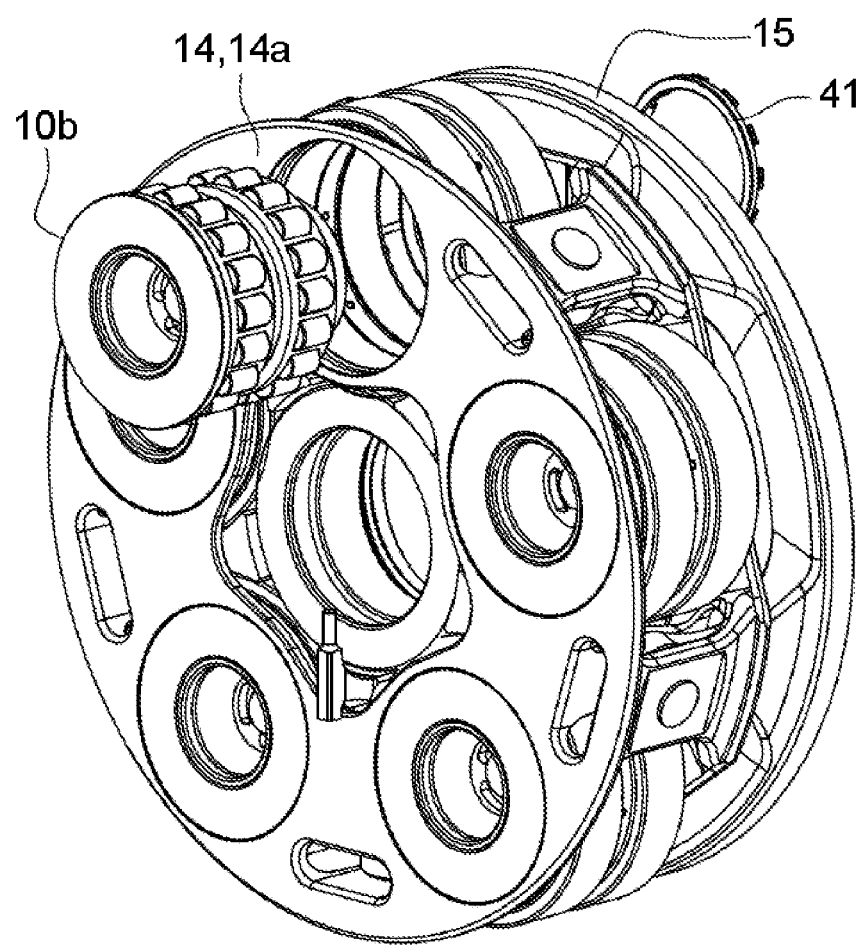

LUBRICATING AND COOLING CORE FOR A MECHANICAL REDUCTION GEAR OF AN AIRCRAFT TURBINE ENGINE

CROSS REFERENCE TO RELATED APPLICATION

This application claims priority under 35 U.S.C. § 119 to FRSN 1871749, filed Nov. 23, 2018, the entirety of which is hereby incorporated by reference.

TECHNICAL FIELD OF THE INVENTION

The present disclosure relates to the field of reduction gears for turbine engines, for example of an aircraft.

BACKGROUND

The state of the art includes documents WO-A1-2010/092263, FR-A1-2 987 416, EP-A1-3 333 459, EP-A1-3 290 751, EP-A2-2 333 250, FR-A-1 357 038 and FR-A1-3 041 054.

The purpose of a mechanical reduction gear is to change the speed to torque ratio between the input shaft and the output shaft of a mechanical system.

The new generations of bypass turbine engines, in particular turbine engines with high dilution rates, comprise a mechanical reduction gear that drives the shaft of a fan. Usually, the purpose of the reduction gear is to transform the "fast" rotational speed of a power turbine into a slower rotational speed for the shaft driving the fan.

This type of reduction gear comprises a central pinion, termed sun gear, a ring gear and pinions termed planet gears, the latter engaging between the sun gear and the ring gear. The planet gears are maintained by a chassis termed planet-carrier. The sun gear, the ring and the planet-carrier are planetary elements because their axes of revolution are the same as the longitudinal axis X of the turbine engine. Each planet gear has a different axis of revolution, evenly distributed over a single operating diameter around the axis of the planetary elements. These axes are parallel with the longitudinal axis X.

There are several reduction gear architectures. According to the state of the art in the field of bypass turbine engines, the reduction gears are of the planetary or epicyclic type. In other similar applications, "differential" or compound architectures can be found.

In a planetary reduction gear, the planet carrier is fixed, and the ring gear constitutes the output shaft of the device that rotates in the opposite direction with respect to the sun gear.

In an epicyclic reduction gear, the ring gear is fixed, and the planet-carrier constitutes the output shaft of the device that rotates in the same direction as the sun gear.

In a differential reduction gear, no element is rotationally fixed. The ring gear rotates in the opposite direction with respect to the sun gear and the planet-carrier.

The reduction gears can comprise one or several gear stages. This gearing is achieved in different ways, such as by contact, by friction and even by magnetic fields.

There are several types of gearing by contact, such as with straight or herringbone gearings.

The present invention proposes to improve a reduction gear with an efficient and economical solution to improve the circulation and/or the evacuation of oil in a turbine engine.

SUMMARY

In an aspect, the present disclosure provides a deflector for a mechanical reduction gear of a turbine engine, for example of an aircraft, the deflector being configured to be inserted between two adjacent planet gears of the reduction gear, the deflector comprising a block comprising a first side surface that is cylindrical and concave and has a radius of curvature R1 measured from an axis G1, the block comprising a second side surface, opposite the first surface, that is cylindrical and concave and has a radius of curvature R1 measured from an axis G2 parallel with G1, wherein it comprises on each of the first and second surfaces at least one protruding tab that has a general elongate shape around the axis G1, G2 of the considered surface and whereof the inner periphery is curved and concave and has a radius of curvature R2 measured from the axis G1, G2 that is smaller than R1.

The deflector thus comprises tabs on these cylindrical surfaces surrounding the planet gears. Each of these tabs is configured to be inserted in an inter-helical groove of the gearing of a planet gear, to extend along this groove. Indeed, a planet gear comprises a gearing with at least two helixes (respectively front and rear), i.e., a gearing comprising two adjacent toothed annular bands. These two helixes are separated from one another by an annular groove. It should therefore be understood that the helixes of a planet gear are separated from one another by the tab of a deflector, in the zone of insertion of the deflector. The tab serves as an "inter-helical deflector", in addition to the "inter-planet gear deflector".

This aspect prevents the recirculation of oil and particles between the front and rear helixes of the planet gears. The advantages of this deflector are numerous: no oil recirculation between the helixes and therefore an improved evacuation of the energy generated during operations, limited transition of particles, stiffening of the structure of the deflector, etc.

This aspect is compatible with any type of reduction gear (planetary, epicyclic, etc.). It is also compatible with any type of gearing (straight, herringbone), provided the gearing comprises at least two helixes. It is also compatible with any type of planet-carrier, be it of a single block or of the cage/cage-carrier type. Finally, it is compatible with any type of planet gear bearing, be it a roller bearing or a hydrodynamic bearing, etc.

The deflector according to the present disclosure can comprise one or several of the following characteristics, taken individually or in combination:

the deflector comprises a single tab protruding on each of the surfaces, for example substantially at the center of the surface: operationally, it may be located opposite the channel or groove of the planet gears that extends between the two helixes thereof, the deflector comprises several tabs protruding on each of the surfaces, each tab has a circumferential scope that is smaller than or equal to the circumferential scope of the surface on which it is located, each tab has a circumferential scope that is greater than the circumferential scope of the surface on which it is located; the end portions of the tabs can thus extend protruding on the deflector, the deflector comprises tapped holes for receiving screws for securing the deflector to a planet-carrier of the reduction gear, the deflector comprises an integrated lubrication circuit, the circuit comprises an oil inlet connected by drill holes to at least one oil outlet, the oil inlet comprises a male-female fitting connection pipe, the deflector comprises an oil outlet configured to receive a sealed fluid connection socket, the deflector comprises an oil outlet formed by a nozzle formed of a single part with the block, the nozzle having a general elongate shape extending in a median plane of symmetry of the block.

This stiffens the nozzle, which is cantilevered when lubricating the splines of the sun gear, and limits the number of parts and interfaces by merging the known functions of the deflector and of the nozzle, while also facilitating the mounting of the deflector. The advantages include: a shorter nozzle (less subject to vibrations), fewer parts and therefore fewer references, fewer machining operations and fewer assembly steps, etc.

The present disclosure also relates to a planet-carrier for a mechanical reduction gear of a turbine engine, for example of an aircraft, comprising a cage defining a housing to receive a central sun gear with an axis of rotation X, planet gears arranged around the sun gear and each comprising a double-helix gearing, as well as deflectors such as described above, each of which is secured to the cage and inserted between two adjacent planet gears so that its tabs are inserted in the inter-helical grooves of the gearings of these planet gears.

Advantageously, one of the deflectors of the planet-carrier comprises a nozzle oriented in a radial direction with respect to the axis X and inwards so as to be able to spray oil on the inner splines of the sun gear.

Advantageously, the cage comprises a radial wall comprising a central orifice of which a radially internal peripheral edge comprises one or several notches to facilitate the mounting of the deflectors, including the deflector comprising the nozzle.

According to a second aspect, the present disclosure provides a lubricating and cooling core for a mechanical reduction gear of a turbine engine, for example of an aircraft, wherein it is configured to be mounted in the axle of a planet gear of the reduction gear, and comprises first and second coaxial and substantially frusto-conical shields each comprising a first end with a greater diameter and a second opposite end with a smaller diameter, the shields being secured to one another by their second ends and being configured to extend inside the axle and to cover at least a radially internal surface of the axle to define with the latter at least one annular cavity for the circulation of oil for lubricating and cooling the axle, the second ends of the first and second shields comprising fluid connection means configured to connect the at least one cavity to a source of lubricating and cooling oil.

The purpose of the core is to collect lubricating oil and to distribute and transport it to various elements of the reduction gear. The core comprises two separate circuits, which is advantageous because the circuits can circulate oil at different flow rates and/or temperatures, thereby limiting the transfer of contaminations. The single-block design of this core facilitates its mounting inside the reduction gear, optimises the weight thereof, and limits vibratory phenomena. The diameter of this core is advantageously chosen to facilitate its integration in the reduction gear. The diameter of the reduction gear, for example of its chambers is, for example, smaller than the outer diameter of the planet-carrier (or of the cage and cage-carrier of the planet-carrier) and greater than the outer diameter of an input shaft of the reduction gear that is engaged with and coupled to the sun gear. This input shaft can comprise a segment in the form of bellows, providing the shaft with some degree of flexibility to better compensate for misalignments of the engine shaft.

The advantages provided by this aspect are: an improved integration of the core in the engine, a significant gain of space to increase the flexibility of the engine shaft (which enables improved compensation for misalignments of the reduction gear), a potentially stiffer structure (and therefore less subject to vibratory phenomena), a single connection interface for the various oil outlets, a shortened oil path with reduced pressure losses, etc.

This second aspect is designed for a planetary reduction gear, but it is also compatible with an epicyclic reduction gear if a few adjustments are made. It is compatible with all types of gearing (straight or herringbone), and with all types of planet-carrier, including the single-block and the cage/cage-carrier type. Finally, this aspect is compatible with any type of planet gear bearing, be it a roller bearing or a hydrodynamic bearing, etc.

The core according to the present disclosure can comprise one or several of the following characteristics, taken individually or in combination:

each of the first ends, and even each of the second ends, comprises an outer cylindrical centering surface comprising an annular channel for receiving a gasket, one of the shields comprises an inner chamber centered on an axis Y common to the shields, this chamber being connected, on the one hand, by radial passages formed in this shield or between the two shields to the at least one annular cavity, and on the other hand, to a connection pipe centered on the axis Y, the pipe is configured to cooperate by male-female fitting, and for example with a fluid connection socket that can be used to connect the pipe to a distributor of lubricating oil, the chamber has a general cylindrical shape centered on the axis Y and comprises a longitudinal end connected to the pipe and an opposite longitudinal end that is either closed, or open and leads into another chamber, this other chamber being formed in the other shield and being connected by other radial passages to the at least one annular cavity, the shields are configured to be secured to one another, for example only to one another, the shields are configured to be secured to one another and to an annular attachment flange of the planet gear axle, the shields bear against either side of the flange; as there is no clearance, the core cannot move in translation along the axis Y; the mounting is therefore less hyperstatic, the shields are secured by one or several screws distributed around the axis Y;

as the attachment means are not aligned with the axle of the bearing and as the axle passes through a passage hole in the bearing, the core is prevented from rotating about itself; the core therefore has its first degree of freedom blocked, the core comprises an inner chamber that is sized to ensure a distribution of oil through deceleration, reducing fluid kinetic effects.

The present disclosure also relates to an axle of a planet gear of a mechanical reduction gear of a turbine engine, for example of an aircraft, this axle having a general tubular shape and comprising substantially radial orifices extending from at least one radially internal surface of this axle to the outer periphery of this axle, a core such as described above being mounted in this axle and covering the at least one surface.

The axle according to the present disclosure can comprise one or several of the following characteristics, taken individually or in combination:

- the outer periphery of the axle is configured to define at least one, e.g., two, rolling track(s) for the bearing(s),
- the inner periphery of the axle is of the bi-conical type and comprises, for example, two coaxial frusto-conical surfaces flaring out in opposite directions, these two frusto-conical surfaces being covered by the shields and defining with these shields one or two annular cavity(-ies) for the circulation of oil.

According to a third aspect, the present disclosure provides a lubricating oil distributor for a mechanical reduction gear of a turbine engine, for example of an aircraft, wherein it has a general annular shape around an axis X and is formed of a single part, the distributor comprising first and second independent oil circuits, the first oil circuit comprising a first oil inlet connected by a first annular chamber to several oil outlets distributed over a first circumference C1 around the axis X, and the second oil circuit comprising a second oil inlet connected by a second annular chamber to several oil outlets distributed over a second circumference C2 around the axis X, the first and second circumferences having different diameters.

The axle of a planet gear of a reduction gear is guided by at least one bearing. The heat generated by the passage of the moving elements of the rollers of the bearing should be evacuated. The bearing is supplied with oil by orifices that run radially through the axle of the planet gear. The circulation of this oil inside the axle of the planet gear, and for example on the inner periphery of the axle, absorbing the heat energy generated by the bearing during operations. The heat energy is transferred by conduction from the first inner ring of the bearing, which can be integrated at the outer periphery of the planet gear axle, to the inner periphery of the axle. The present disclosure applies to different shapes on the inner periphery of the planet gear axle, and for example to a bi-conical inner periphery. The use of two independent shields ensures a fit with all shapes of inner periphery of an axle, and for example a bi-conical shape, in order to form one or several cavities for the circulation of oil to lubricate and cool the axle.

The proposed solution is compatible with any type of reduction gear (planetary, epicyclic, etc.). The solution is compatible with all types of gearing (straight, herringbone), and with all types of planet-carrier, including the single-block and the cage/cage-carrier type. Further, the solution is compatible with the types of planetary bearings that comprise rolling elements (ball bearings, roller bearings, tapered roller bearings, etc.).

The distributor according to the present disclosure can comprise one or several of the following characteristics, taken individually or in combination:

- the first and second inlets are oriented in a radial direction with respect to the axis X,
- the first and second inlets are located in a same plane perpendicular to the axis X and are at a predetermined angle with respect to one another,
- the axial cross-section of the first and second chambers has a general circular shape,
- the first and second chambers are formed by two inextricably connected and coaxial tubular rings,
- the diameter of the first circumference C1 is smaller than that of the rings, and the diameter of second circumference C2 is greater than that of the rings,
- the first and/or second outlets are oriented axially in the same direction,
- the distributor comprises attachment lugs comprising orifices for the passage of screws,
- the first and second chambers each has a diameter that is greater than the outer diameter of a portion of a shaft configured to intersect axially with the distributor; this shaft is an input shaft of the reduction gear,
- the diameter and orientation of the first and second chambers are arranged so that the oil outlet conduits are of similar length; this arrangement also makes it possible to provide oil inlet conduits with the shortest length, with the most linear shape and having a comfortable radius of curvature; it also makes it possible to provide conduits with a circular cross-section that open fully and in a tangential manner onto their respective chambers; it is thus possible to meet all these conditions while having oil inlet axes that are on a same median plane; it is advantageous, on the one hand, to have short oil inlets in order to facilitate the mounting of the distributor, which has a diameter that is smaller than the diameter of the cage-carrier; on the other hand, it is advantageous to have linear conduits that open fully and in a tangential manner onto the chambers in order to reduce pressure losses to a minimum;
- all the oil outlets, whether they are connected to the first chamber or to the second chamber, are identical; this enables use of the same machining tools, the same controls, and the same O-rings on the deflectors and on the core,
- at least some of the oil inlets are moved forward so as to be inserted in the axis and in the rear shield of the core; this reduces the length of the oil conduit and increases the rigidity of the assembly.

The present disclosure also relates to a planet-carrier for a mechanical reduction gear of a turbine engine, for example of an aircraft, comprising a cage defining a housing to receive a central sun gear with an axis of rotation X and planet gears arranged around the sun gear, a distributor such as described above being provided on and secured to the cage.

Advantageously, the cage comprises, at its periphery, axial housings configured to receive axial fingers secured to a cage-carrier of the reduction gear, each housing being intersected by a substantially radial pin that is configured to rotationally guide a connection means, such as a ball-and-socket connection or a bearing, supported by one of the fingers, the first and second inlets of the distributor being respectively oriented along first and second directions that each intersects with a sector of free space delimited axially by the cage and the cage-carrier and extending circumferentially between two adjacent fingers.

The present disclosure further relates to a mechanical reduction gear of a turbine engine, for example of an aircraft, comprising at least one of the elements (deflector, core, distributor, planet-carrier, axis, etc.) described above, as well as a turbine engine comprising such a reduction gear.

The characteristics of the different aspects of the present disclosure can be combined with one another.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a schematic axial cross-section view of one representative embodiment of a turbine engine of the present disclosure, FIG. 2 is a partial axial cross-section view of a mechanical reduction gear, FIG. 3 is an axial cross-section view of a mechanical reduction gear incorporating several aspects of the present disclosure, FIG. 4 is a perspective view of the reduction gear of FIG. 3, FIG. 5 is a perspective view of a lubricating oil distributor of the reduction gear of FIG. 3, FIG. 6 is a cross-section view of a detail of the reduction gear of FIG. 3, and shows an oil inlet of the distributor of FIG. 5, FIG. 7 is a cross-section view of a detail of the reduction gear of FIG. 3, and shows an oil inlet of the distributor of FIG. 5, FIG. 8 is a cross-section view of a detail of FIG. 3 and shows an axis of a planet gear in which is mounted a lubricating and cooling core, FIG. 9 is an exploded perspective view of the axis and of the core of FIG. 8, FIG. 10 is a cross-section view along the line X-X of FIG. 8, FIG. 11 is a view similar to that of FIG. 8 and shows the path of the lubricating and cooling oil, FIG. 12 is a view similar to that of FIG. 8 and showing an alternative embodiment of the core, FIG. 13 is a view similar to that of FIG. 12 and shows the path of the lubricating and cooling oil, FIG. 14a is a perspective view of a deflector, FIG. 14b is a view similar to that of FIG. 14a and showing an alternative embodiment of a deflector, FIG. 15 is a partial radial cross-section view of the reduction gear of FIG. 3, and shows the position of the deflector of FIG. 14 in the reduction gear, FIG. 16 is a cross-section view along the line XVI-XVI of FIG. 15, FIG. 17 is a partial perspective view of a front face of the reduction gear of FIG. 3, FIG. 18 is a view of the front face of the reduction gear of FIG. 3, FIG. 19 is a schematic perspective view of the reduction gear of FIG. 3, and shows an assembly step of the reduction gear, FIG. 20 is a schematic perspective view of the reduction gear of FIG. 3, and shows an assembly step of the reduction gear, FIG. 21 is a schematic perspective view of the reduction gear of FIG. 3, and shows an assembly step of the reduction gear, FIG. 22 is a schematic perspective view of the reduction gear of FIG. 3, and shows an assembly step of the reduction gear.

DETAILED DESCRIPTION

FIG. 1 describes one representative embodiment of a turbine engine 1 that comprises, conventionally, a fan S, a low-pressure compressor 1a, a high-pressure compressor 1b, an annular combustion chamber 1c, a high-pressure turbine 1d, a low-pressure turbine 1e, and an exhaust pipe 1h. The high-pressure compressor 1b and the high-pressure turbine 1d are connected by a high-pressure shaft 2 and form with the latter a high-pressure (HP) body. The low-pressure compressor 1a and the low-pressure turbine 1e are connected by a low-pressure shaft 3 and form with the latter a low-pressure (LP) body.

The fan S is driven by a fan shaft 4, which is driven with the LP shaft 3 by means of a reduction gear 6. The reduction gear 6 is generally of the planetary or the epicyclic type.

Although the following description relates to a planetary reduction gear or an epicyclic reduction gear, it also applies to a mechanical differential in which the three components, i.e., the planet-carrier, the ring gear and the sun gear are rotationally mobile, the rotational speed of one of these components depending on the speed difference of the two other components, for example.

The reduction gear 6 is positioned in the front part of the turbine engine. A fixed structure comprising schematically, in this case, an upstream part 5a and a downstream part 5b, constituting the engine crankcase or stator 5, is arranged to form an enclosure E around the reduction gear 6. This enclosure E is here closed in the upstream part by gaskets located at the level of a bearing and allowing the passage of the fan shaft 4, and in the downstream section by gaskets located at the level of the passage of the LP shaft 3.

FIG. 2 shows one representative embodiment of a reduction gear 6 that can have different architectures depending on whether some parts are fixed or rotating. At the inlet, the reduction gear 6 is connected to the LP shaft 3, for example by means of inner splines 7a. The LP shaft 3 drives a planet pinion termed sun gear 7. Conventionally, the sun gear 7, of which the axis of rotation is the same as that of the turbine engine X, drives a series of pinions termed planet gears 8, these planet gears being evenly distributed over a single diameter around the axis of rotation X. This diameter is equal to twice the operating center distance between the sun gear 7 and the planet gears 8. The number of planet gears 8 generally ranges from three to seven for this type of application.

The planet gears 8 are maintained by a chassis termed planet-carrier 10. Each planet gear 8 rotates about its own axis Y, and engages with the ring gear 9.

At the output, this provides:

In an epicyclic configuration, the planet gears 8 rotationally drive the planet-carrier 10 about the axis X of the turbine engine. The ring gear is secured to the engine crankcase or the stator 5 by means of a ring-carrier 12 and the planet-carrier 10 is secured to the fan shaft 4.

In a planetary configuration, the planet gears 8 are maintained by a planet-carrier 10 that is secured to the engine crankcase or the stator 5. Each planet gear drives the ring gear, which is supported on the fan shaft 4 by means of a ring-carrier 12.

Each planet gear 8 is mounted free to rotate by means of a bearing 11, for example a roller bearing or a hydrostatic bearing. Each bearing 11 is mounted on one of the axles 10b of the planet-carrier 10 and all the axles are positioned with respect to one another by means of one or several structural chassis 10a of the planet-carrier 10. The number of axles 10b and of bearings 11 is equal to the number of planet gears. For operating, assembly, manufacturing, control, repairs or replacement reasons, the axles 10b and the chassis 10a can be divided into several parts.

For the reasons mentioned above, the gearing of a reduction gear can be divided into several helixes, each with a median plane P. In this example, the operation of a reduction gear with several helixes and with a ring gear divided into two half-ring gears includes:

A front half-ring gear 9a having a rim 9aa and an attachment half-flange 9ab. The rim 9aa comprises the front helix of the gearing of the reduction gear. This front helix engages with that of the planet gear 8, which in turn engages with that of the sun gear 7.

A rear half-ring gear 9b having a rim 9ba and an attachment half-flange 9bb. The rim 9ba comprises the rear helix of the gearing of the reduction gear. This rear helix engages with that of the planet gear 8, which in turn engages with that of the sun gear 7.

Although the helix widths vary between the sun gear 7, the planet gears 8, and the ring gear 9 because of overlapping gearings, they are all centered on a median plane P for the front helixes, and on another median plane P for the rear helixes. In the other figures, in the case of a roller bearing with two rows of rollers, each row of rolling elements is also centered on two median planes.

The attachment half-flange 9ab of the front ring gear 9a and the attachment half-flange 9bb of the rear ring gear 9b form the attachment flange 9c of the ring gear. The ring gear 9 is secured to a ring-carrier by assembling the attachment flange 9c of the ring gear to the attachment flange 12a of the ring-carrier by means of a bolted assembly for example.

The arrows of FIG. 2 show the path of the oil in the reduction gear 6. The oil arrives in the reduction gear 6 from the stator part 5 in the distributor 13 by different means that are not detailed in this view as they are specific to one or several types of architecture. The distributor is divided into 2 parts, and generally each part has the same number of planet gears. The purpose of the injectors 13a is to lubricate the gearings and the purpose of the arms 13b is to lubricate the bearings. The oil is brought to the injector 13a, exiting at its end 13c to lubricate the gearings. The oil is also brought to the arm 13b, and circulates through the supply intake 13d of the bearing. The oil then circulates through the axle or in one or several buffer zones 10c to then exit through the orifices 10d in order to lubricate the bearings of the planet gears.

FIGS. 3 and 4 show an embodiment of a reduction gear 6 comprising several aspects of the present disclosure.

One of these aspects relates to a lubricating oil distributor and is described below with reference to FIGS. 5 to 7. Another aspect of the present disclosure relates to a lubricating and cooling core and is described below with reference to FIGS. 8 to 13, and still another aspect of the present disclosure relates to a deflector and is described below with reference to FIGS. 14 to 22.

The reduction gear 6 of FIGS. 3 and 4 comprises a planet-carrier 10 of the cage 14 and cage-carrier 15 type, the cage 14 and the cage-carrier 15 being connected by ball and socket connections.

The cage 14 comprises two radial annular walls 14a, 14b that extend around the axis X, these walls 14a, 14b being parallel and being respectively a front radial wall 14a and a rear radial wall 14b. The walls 14a, 14b are connected to one another at the outer peripheries thereof by pairs of fins 14c, 14d that are evenly distributed around the axis X. These pairs of fins provide a structural connection between the walls 14a, 14b. Each pair of fins comprises two fins, respectively radially external 14c and radially internal 14d, that extend substantially parallel along the axis X at a radial distance from one another.

The pairs of fins 14c, 14d define between them apertures 16 that extend circumferentially about the axis X and are axially delimited by the outer peripheral edges of the walls 14a, 14b. There are 5 pairs of fins in the example shown.

Each pair of fins forms a clevis to receive a finger 15a of the cage-carrier 15. In other words, the fins of each pair define between them a housing to receive a finger 15a of the cage-carrier 15. Oblong openings 14e are provided in the rear wall 14b so as to let the fingers 15a pass between the fins 14c, 14d. The wall 14a can comprise similar openings aligned axially with the openings 14e of the wall 14b.

The number of fingers 15a is equal to the number of pairs of fins 14c, 14d and is 5 in the example shown. These fingers 15a extend axially in the upstream direction from a ring 15b of the cage-carrier 15 extending about the axis X. The fingers 15a of the cage-carrier 15 are engaged in the housings between the fins by an axial translation motion from the rear, through the openings 14e of the wall 14b.

Each finger 15a comprises, substantially in its middle, a recess for mounting a bearing (not shown) configured to be intersected by a cylindrical pin 17 supported by each pair of fins 14c, 14d. Each pin 17 intersects with the inter-fin housing and has a substantially radial orientation with respect to the axis X. Each pin 17 comprises a cylindrical body 17a connected at one end, here the radially external end, to a collar 17b. The pin 17 is here engaged by a radial translation motion from the outside through the radial orifices of the fins 14c, 14d, its collar 17b being configured to come and bear radially against a flat face 14ca of the outer fin 14c. After the insertion of the pin 17 in the orifices of the fins, until the collar 17b comes to bear against the outer fin, the collar 17b is secured to the fin, for example by screwing.

As can be seen in the drawings, in the assembled position, the ring 15b of the cage-carrier 15 is axially offset by a predetermined distance L1 from the rear wall 14b opposite the cage 14 (FIG. 3). The annular space extending from the outer periphery of the cage 14 to the outer periphery of the cage-carrier 15 is divided in sectors by fingers 15a that thus define between them spatial sectors S1 (FIG. 4).

The cage 14 defines an inner housing for receiving the sun gear 7 with an axis X, of the planet gears 8 arranged around the sun gear 7 and engaging therewith, as well as of deflectors 18, that are described in detail below with reference to FIG. 14 and following.

As described above for FIG. 2, the sun gear 7 comprises inner splines 7a for coupling with outer complementary splines 3a of the LP shaft 3 (FIG. 3). It should be noted that the splines 3a are located at the front end of the LP shaft 3, which comprises a downstream segment 3b in the form of bellows. This segment 3b is here located in a plane P1 perpendicular to the axis X, which is axially offset from the cage 14 of the planet-carrier 10 and passes substantially through the ring 15b of the cage-carrier 15. This segment 3b provides the LP shaft 3 with some degree of flexibility that limits the transfer of stress from the engine to the reduction gear during operations. The splines 3a are in this case located on a circumference C3 with an axis X and a diameter D3, and the segment 3b has an outer diameter D3' that is greater than D3 and smaller than the inner diameter D5 of the ring 15b.

The reduction gear 6 comprises a perfected lubricating oil distributor 13 that is better shown in FIG. 5.

The distributor 13 has a generally annular shape around the axis X and it is made of a single part. Here, it is provided and secured on the planet-carrier 10 and comprises, for this purpose, attachment lugs 19a on cage 14 of the planet-carrier and for example on its rear wall 14b, as shown in FIG. 4. The lugs 19a are evenly distributed around the axis X and comprise portions pressed against the downstream radial face of the wall 14b and comprising orifices for the passage of screws 19b, which are screwed in the tapped holes of the wall 14b.

The distributor 13 comprises first and second independent oil circuits 20, 21, the first oil circuit 20 comprising a first oil inlet 20a connected by a first annular chamber 20b to several oil outlets 20c distributed over a first circumference C1 about the axis X, and the second oil circuit 21 comprises a second oil inlet 21a connected by a second annular chamber 21b to several oil outlets 21c distributed over a second circumference C2 about the axis X (FIGS. 3 and 5).

The circumference C1 has a diameter D1 and the circumference C2 has a diameter D2, D2 being greater than D1. The oil outlets 20c are located on D1 or C1 and the outlets 21c are located on D2 or C2. In the example shown, D1 and D2 are both greater than D3 and smaller than D5.

The diameter of the distributor 13 is smaller than D5, which enables its assembly/disassembly without having to interfere with the rest. Because of the pins 17 and the deflectors 18, the cage and the cage-carrier are mounted first, followed by the sun gear 7, the planet gears 8, the axles 10b and the distributor 13, as is described in further detail below.

The outer diameter of the distributor 13 corresponds to the end of the inlets 20a, 21a (which end at the same circumference).

The chambers 20b, 21b are formed by two coaxial and inextricably connected tubular rings, i.e. their tubular walls are welded together. The chambers have, along an axial cross-section, a generally circular shape and the passage sections of the chambers are substantially constant on their entire angular length and are substantially identical to one another.

The first chamber 20b extends substantially over a circumference C4 with a diameter D4 between D1 and D2. The second chamber 21b extends substantially over another circumference C4' with a diameter D4' between D1 and D2. D4' is greater than D4. The circumferences C4 and C4' are centered on the axis X. D1 is smaller than D4 and D4', whereas D2 is greater than D4 and D4'. It is advantageous that C4 and C4' are located substantially at mid-(radial) distance between C1 and C2, as this rigidifies the distributor 13.

The greater diameter chamber 21b is located in front of the smaller diameter chamber 20b. As can be seen in FIG. 4, the chambers extend along planes P2, P3 that are perpendicular to the axis X and intersect with the cage 14, on the one hand, and with the ring 15b of the cage-carrier 15, on the other hand. This FIGURE also shows that the plane P3, which intersects with the second chamber 20b or rear chamber, is close to the segment 3b of the shaft LP 3 and that its diameter D4' is greater than the diameter D3' of the segment 3b, in order to avoid any contact during operations.

The inlets 20a, 21a are oriented in a radial direction with respect to the axis X. They are, for example, located in a same plane P4 perpendicular to the axis X and are sloped with respect to one another in this plane P4 by a given angle α (FIGS. 5 to 7). This angle α is for example between 30 and 60°. As seen in FIG. 4, the inlets 20a, 21a are oriented respectively along directions, each intersecting with one of the abovementioned spatial sectors S. A finger 15a of the cage-carrier passes between the two inlets 20a, 21a.

The planes P2, P3 and P4 are located between the cage 14 and the ring 15b of the cage-carrier 15 (FIGS. 6 and 7).

The distributor 13 is advantageously configured to be connected fluidly, at the level of its inlets and its outlets, by male-female fitting, i.e. by connections that fit along an axial direction of motion of a male connector into a female connector. Even if a connector is presented in the following description as being male and configured to engage with a female connector, it can alternatively be replaced by a female connector configured, therefore, to engage with a male connector, and conversely.

With regard to the inlets 20a, 21a, each one comprises a female connector 20aa, 21aa in the example shown, configured to receive the male connector of a supply pipe 20f, 21f (FIGS. 4, 6 and 7). The pipes 20f, 21f are rectilinear and intersect with the abovementioned spatial sectors S and are configured to also intersect with tubular arms of an intermediary crankcase of the turbine engine 1, for the purpose of connecting the distributor 13 to a source of lubricating oil. The number of arms of the crankcase can be greater than 5 and therefore than the number of spatial sectors S. The sealing of the male-female connections can be achieved with O-rings or similar gaskets.

The female connectors 20aa, 21aa of the inlets 20a, 21a are connected to the respective chambers through conduits 20d, 21d. The connector 20aa of the inlet 20a is connected to the chamber 20b the farthest from the plane P4 by a conduit 20ab that is generally S-shaped (FIG. 6). The connector 21aa of the inlet 21a is connected to the chamber 21b the closest to the plane P4 by a conduit 21ab that is rectilinear or features a slight elbow (FIG. 7).

With regard to the outlets 20c, each one comprises a female connector 20ca in the example shown, configured to receive the male connector of one of the deflectors 18. These outlets 20c are oriented axially, all in the same direction, which here is forwards. The connectors 20ca of these outlets are connected to the chamber 20b by substantially L- or V-shaped ducts 20d (FIG. 5).

With regard to the outlets 21c, each one comprises a female connector 21ca in the example shown, configured to receive the male connector of one of the lubricating and cooling cores 22, which will be described in further detail below with reference to FIGS. 8 to 13. These outlets 21c are oriented axially, all in the same direction, which here is forwards. The connectors 21ca of these outlets are connected to the chamber 21b by substantially L- or V-shaped conduits 21d.

As can be seen in FIG. 3, the lengths or axial dimensions of the ducts 20d and of the conduits 21d are different, the outlets 21c being located in a plane P5 perpendicular to the axis X, which is further forwards than the plane P6, which passes along the outlets 20c. The planes P5 and P6 are located in the cage 14.

Finally, as can be seen in FIG. 5, the ducts 20d are connected to the ring forming the chamber 20b by joins 20e located on the inner periphery of the ring, whereas the conduits 21d are connected to the ring forming the chamber 21b by joins 21e located on the outer periphery of the ring (FIG. 5).

As mentioned above, the outlets 21c of the distributor 13 are connected to cores 22, which are now described with reference to FIGS. 8 to 13.

The purpose of the cores 22 is to lubricate and cool the axles 10b of the planet gears 8, which are here centered and guided by bearings 11 with rollers 11a.

In the shown embodiment examples, each axles 10b is guided by a double-roller bearing 11, i.e. with double rows of rollers 11a. The two rows extend about a single axis that corresponds to the axis, noted Y of the axle 10b of the planet gear 8.

Conventionally, the two rollers are guided in tracks defined by inner and outer rings. In the example shown, a feature of the present disclosure resides in that the inner rings for guiding the rollers 11a are integrated in the axle 10b. The outer periphery of the axle 10b therefore comprises cylindrical tracks 11b for the rolling of the rollers 11a, each track 11b being axially delimited by annular ribs 11c, the purpose of which is to guide the cages 11d maintaining the rollers 11a. Furthermore, FIG. 3 shows that the outer rings are integrated at the inner periphery of the planet gears 8. The inner periphery of the planet gears 8 therefore comprises cylindrical tracks 8a for rolling the rollers 11a, the tracks 8a being separated from one another by an annular groove 8b opening radially inwards and at the bottom of which two radial drill holes 8c have been provided for the flow of oil.

The outer periphery of each planet gear 8 comprises a double-helix gearing 8d, i.e. two adjacent and coaxial helixes that are separated from one another in this case by an annular groove 8e opening radially outwards and at the bottom of which the drill holes 8c open.

The inner periphery of the axle 10b of each planet gear 8 has a generally bi-conical shape and comprises two inner frusto-conical surfaces 10e, 10f that are flared in opposite axial directions. The front inner frusto-conical surface 10e is thus flared towards the front, and the rear inner frusto-conical surface 10f is flared towards the rear. In the example shown, a cylindrical surface 10g is located between the frusto-conical surfaces 10e, 10f, a front inner cylindrical surface 10h extends between the front end of the axle 10b and the front end of the surface 10e, and a rear inner cylindrical surface 10i extends between the rear end of the axle 10b and the rear end of this axle 10b.

Orifices 10d for the passage of oil are provided through the axles 10b in a radial direction, and therefore extend between their inner and outer peripheries. In the example shown, they extend between the frusto-conical surface 10e, 10f on the one hand, and the tracks 11b and the outer peripheries of the ribs 11c on the other hand.

An annular flange 10ga for attaching the core 22 extends radially inwards from the cylindrical surface 10g. This flange 10ga comprises axial orifices for the passage of screws 30.

In the first embodiment of the core 22 shown in FIGS. 8 to 11, the core 22 comprises two coaxial and substantially frusto-conical annular shields 22a, 22b, each comprising a first end with a greater diameter and a second opposite end with a smaller diameter. The shields, respectively front shield 22a and rear shield 22b, are secured to one another by their second ends. Similarly to the surfaces 10e, 10f, the shields 22a, 22b are thus flared in opposite axial directions.

The shields 22a, 22b are mounted adjusted inside the axle 10b and are configured to cover the frusto-conical surfaces 10e, 10f to define with the latter at least an annular cavity 24 for the circulation of lubricating and cooling oil of the axle 10b. In the example shown, there are two cavities 24, which are separated from one another by the flange 10ga.

The ends of the shields 22a, 22b each comprise a centering outer cylindrical surface comprising an annular groove for receiving a gasket 25a. The front shield 22a comprises an upstream end mounted fitted by its outer cylindrical surface on the surface 10h, and a downstream end mounted fitted by its outer cylindrical surface on the surface 10g, in front of the flange 10ga. The rear shield 22b comprises an upstream end mounted fitted by its outer cylindrical surface on the surface 10h, behind the flange 10ga, and a downstream end mounted fitted by its outer cylindrical surface on the surface 10i.

FIG. 8 shows that the orifices 10d open radially into the cavities 24. It also shows that the shields 22a, 22b comprise fluid connection means of the cavities 24 to the distributor 13 described above, e.g., a conduit or channel.

The rear shield 22b comprises in this case an inner chamber 26 centered on the axis Y and connected, on the one hand, by radial passages 27 formed in the shield to the cavity 24 delimited by the shield and its surface 10f. This shield 22b further comprises a connection pipe 25 centered on the axis Y, one end of which opens into the chamber 26 and the opposite end of which is oriented towards the rear and forms a male connector configured to receive by fitting one of the female connectors 21ca of an outlet 21c of the distributor 13. As a variant, the pipe 25 could form a female connector.

The rear shield 22b is mounted fitted in the axle 10b by an axial translation motion from the rear until its front end comes to bear axially against the flange 10ga. The shield 22b comprises at its front end another connection pipe 23 centered on the axis Y, which defines a front end part of the chamber 26 and is configured to intersect axially with the flange 10ga, at its center, for the purpose of connecting the chamber 26 to an inner chamber 28 of the front shield 22a. The chamber 26 thus extends between the pipe 25 and the chamber 28, the latter being connected to the cavity 24 formed between the shield 22a and the surface 10e by drill holes 29 provided in the shield.

There are three drill holes 27, 29 in each shield 22a, 22b (this number can be 1 or more) and they are evenly distributed about the axis Y (FIG. 10). In the example, there are provided in the same numbers as the attachment screws. The number depends on the radial space remaining after or before the insertion of the screws. Each shield 22a, 22b further comprises orifices for the passage or screwing of attachment screws 30 that serve to secure them to the flange 10ga. The orifices of the shields are aligned with one another and with the orifices of the flange 10ga and the screws 30 are screwed from the rear and through, in the following order, an orifice of the shield 22b, an aligned orifice of the flange 10ga and an orifice of the shield 22a (see FIG. 8).

FIG. 11 shows the path of oil from the distributor 13 to the rollers 11a and to the cage 11d, for the purpose of lubricating the rollers and the cage, and for the purpose of cooling the axle 10b. Oil enters the distributor 13 through its inlet 21a and supplies the chamber 21b before circulating to the outlets 21c. The oil enters the chamber 26 through the pipe 25 and then in the chamber 28 through the pipe 23. The chambers 26 and 28 slows down the oil flow (and to prevent a Venturi effect at the drill holes 27, 29) and to better distribute the oil among the front and rear shields. The oil then circulates through the drill holes 27, 29 and is supplied to the cavities 24. The oil then flows axially along surfaces, from the rear in the upstream direction on the surface 10e, owing to the fact that the drill holes 29 open onto the rear end of the front cavity 24, and from the front towards the rear on the surface 10f, owing to the fact that the drill holes 27 open onto the front end of the rear cavity 24. The oil then circulates in the orifices 10d to reach the tracks 11b and the ribs 11c, for the purpose of lubricating the rollers 11a and the cages 11d. The oil is supplied "cold" by the distributor 13. It circulates in the axle 10b, which is hot, and is therefore heated. It arrives at the right temperature for an optimal lubricating yield of the bearing, having also evacuated the generated heat. The quantity of heat absorbed by the oil depends on the shape of the shields 22a, 22b.

The thickness or the radial dimension of the cavity 24 is chosen based on the expected temperature increase of the oil configured to circulate in the cavity, for example between 10° C. and 60° C. The temperature of the oil exiting the orifices 10d is also influenced by the slope angle of the frusto-conical surfaces 10e, 10f and of the shields 22a, 22b, with respect to the axis Y.

FIGS. 12 and 13 show an alternative embodiment of the core, which is designated by the reference number 122. Its characteristics are designated by the same reference numbers as for the core 22, incremented by a hundred. The above description relating to the core 22 applies to this variant insofar that it does not contradict what follows.

The core 122 differs from the previous embodiment in that the shields 122a, 122b define a single annular cavity 124 with the inner periphery of the axle 110b. This axle 110b does not comprise, in this case, an inner cylindrical surface between its frusto-conical surfaces 110e, 110f. The ends with the smallest diameter of the frusto-conical surfaces 110e, 110f are thus directly connected to one another. The inner periphery of the axle 110b does not include a flange 10ga of the abovementioned type. The cavity 124 has the general shape of a "bobbin". It should also be noted that the radial thickness of this cavity 124 is smaller than that of the previous embodiment. The orifices 110d for the passage of oil are distributed in annular rows and each row of orifices opens into the cavity 124 in the bottom of a radially internal annular groove formed on the surface 110e, 110f.

The chamber 126 of the rear shield 122b fluidly communicates with the pipe 125 and with the radial drill holes 127 that open into the cavity 124. In this case, the chamber 126 is sealed at its front end. The chamber 126 is therefore formed in the rear shield 122b (e.g., only in the rear shield 122b). The drill holes 127 can also be provided in the rear shield 122b (e.g., only in the rear shield 122b) or provided in this shield 122b and axially sealed by the front shield 122a.

The rear shield 122b comprises a central cylindrical extension 131 towards the front that comprises an outer threading and that intersects with a central orifice of the front shield 122a. This extension 131 receives a nut 132 screwed from the front and that comes to bear axially against the front shield, for the purposes of tightening the assembly. Because of the absence of the flange 10ga of the previous embodiment, the shields 122a, 122b are secured to one another (e.g., only to one another) and are maintained in position inside the axle 110b solely by the fitted mounting of the shields on the inner periphery of the axle 110b. The tightening of the nut 132 generates an axial tightening of the inner periphery of the axle 110b between the shields 122a, 122b, owing to the complementarity of forms.

As is seen in the drawings, the ends of the shields with the greatest diameter can further be tightened axially against the cylindrical shoulders 133 of the inner periphery of the axle 110b during the tightening of the nut 132.

FIG. 13 shows the path of oil from the distributor 113 to the rollers 111a, for the purpose of lubricating the rollers and of cooling the axle 110b. The oil enters the distributor 113 as indicated above and then enters the chamber 126 through a socket 137 engaged into the pipe 125. The socket 137 is a connection socket similar to the sockets 37 and its length is adjusted as required. The number of sockets 137 is equal to the number of conduits 21d and enables correcting the misalignment and to achieve an assembly of the distributor 113 on the reduction gear that is less hyperstatic. The oil then circulates in the drill holes 127 to supply the cavity 124, substantially in the middle thereof. The oil flows axially along the surfaces 110e, 110f, from the center of the cavity towards the rear and towards the front. The oil then circulates in the orifices 110d to reach the tracks 111b and the ribs 111c, for the purpose of lubricating the rollers 111a and the cage 111d.

FIGS. 14 and 17 show an embodiment of a deflector 18. As mentioned above, the reduction gear 6 comprises several deflectors 18 that are housed in the cage 14, each of which being arranged between two adjacent planet gears 8. The number of deflectors 18 of the reduction gear 6 is therefore equal to the number of planet gears 8 of the reduction gear.

The primary purpose of a deflector 18 is to guide the lubricating oil of the gearings of the planet gears 8 and to prevent oil recirculation between the planet gears, hence the notion of "inter-planet gear deflector". The deflectors 18 are therefore shaped to fit with the peripheral shape of the planet gears 8.

As is shown in FIGS. 4 and 15, in addition to extending between two adjacent planet gears 8, each deflector 18 is located between the sun gear 7 on the one hand, located radially inwards, and a pair of fins 14c, 14d on the other hand, located radially outwards.

Each deflector 18 comprises a block comprising a first side surface 18a that is cylindrical and concave and has a radius of curvature R1 measured from an axis G1, which is the same as the axis Y of rotation of a planet gear 8 (FIG. 15). The block comprises a second side surface 18b, opposite the first surface 18a, that is cylindrical and concave and has a radius of curvature R1 measured from an axis G2 parallel with G1, which is the same as the axis Y of rotation of another planet gear 8.

Each of the first and second surfaces 18a, 18b comprises a protruding tab 34 that has a generally elongate shape about the axis G1, G2 of the considered surface, and of which the inner periphery is curved and concave and has a radius of curvature R2 measured from this axis G1, G2, that is smaller than RE The tabs 34 of a deflector 18 extend substantially in a single plane that is perpendicular to the axis X and are, for example, located at the center of the respective surfaces 18a, 18b (in the axial direction).

The surfaces 18a, 18b and the tabs 34 extend around the respective axes G1, G2 over an angular range between 30 and 80°, e.g., over the largest possible angular range.

In the example shown and as can be seen in FIGS. 14 and 15, the longitudinal ends of these tabs 34 are recessed with respect to planes passing respectively through the faces 18e, 18f of the deflector 18.

In the alternative embodiment shown in FIG. 23, the longitudinal ends 34a of the tabs 34 could intersect with such planes and protrude, for the purpose of extending the length of these tabs, and therefore the circumferential dimension for guiding oil around the planet gears 8. In this last case, the tab 34 would protrude on the side of the face 18f where the sprays 36cb are located (sun gear side) and on the other side where the fins 14c, 14d and the finger 15a are located. In the solution of FIGS. 14a and 15, the tab covers approximately 2×45° of the circumference of a planet gear (twice, as there are two deflectors on either side). If, as is shown in FIG. 14b, the tab extends out of the deflector so as not to touch the sun gear during mounting and not to extend beyond the circumference of the cage, the tab could reach approximately 2×75° of coverage out of the 360° of the planet gear.

The block of each deflector 18 further comprises a flat front face 18c, that is substantially radial when the deflector is mounted in the cage 14 of the reduction gear, and a flat rear face 18d, that is also substantially radial. The block further comprises an upper flat (or radially external) face 18e that is configured to be oriented towards the pair of fins 14c, 14d, and a lower (or radially internal) face 18f that is configured to be oriented towards the sun gear 7. This face 18f is cylindrical and concave and has a radius of curvature R3 measured from an axis G3 that is the same as the axis X of the sun gear. The purpose of this face 18f is therefore to guide the lubricating oil of the gearing of the sun gear.

The deflectors 18 extend between the radial walls 14a, 14b of the cage 14 and their faces 18a, 18b bear against the inner face at the level of these walls 14a, 14b. The deflectors 18 are secured to the cage 14 by means of screws 35 for example. Each block can comprise, for example on its rear face 18d, tapped holes for receiving screws 35 for securing the deflector to the rear face 14b of the cage 14. An identical configuration on the wall 14a is also possible.

As can be seen in FIG. 4, the tapped holes of each deflector 18 are located substantially in the middle of the height or radial dimension of the deflector, and the screws 35 screwed into these holes pass through orifices of the wall 14b that are located in the vicinity of the radially internal peripheral edge 14ba of this wall 14b (FIGS. 3 and 4). It should therefore be understood that in a mounted position, each deflector 18 has a lower part that extends radially out of the peripheral edge 14ba, between the peripheral edge 14ba and the sun gear 7.

It should further be noted in FIG. 16 that in a mounted position, the tabs 34 of each deflector 18 extend in the middle and interior of the inter-helical grooves 8e of the two planet gears 8 between which the deflector is mounted. A predetermined clearance J is provided between the top of each tab 34 and the opposite bottom of the groove 8e wherein the tab is inserted. The tab 34 has a thickness Ep or axial dimension that represents approximately 10 to 90% of the axial dimension of the groove 8e. The groove 8e of a planet-carrier has a radius R4 measured from the axis Y of the planet gear and its gearing has an outer radius R5 measured from the same axis. The radius R2 is between R4 and R5 and the abovementioned clearance J is equal to the difference between R2 and R4 (FIGS. 15 and 16). The clearance J is reduced to optimise the "inter-helical deflector" function of the tab 34. The purpose of the tabs 34 is to limit the flow of oil from one gearing to another gearing of a single planet gear 8.

Each deflector 18 comprises an integrated lubricating circuit, that comprises an oil inlet 36a connected by drill holes 36b to at least one oil outlet 36c. In the example shown, the oil inlet 36a is located on the rear face 18d and comprises a pipe configured to form a male connector and to cooperate by male-female fitting with the outlet 20c of the distributor 13 described above. Even if a connector is presented in the following description as being male and configured to engage with a female connector, it can alternatively be replaced by a female connector configured, therefore, to engage with a male connector, and conversely (FIG. 3).

Each deflector 18 comprises at least one outlet 36c that is in the form of an orifice 36ca forming a female connector configured to receive a sealed fluid connection socket 37 (FIG. 3). Similarly to the inlet 36a, the socket 37 can be removed and replaced with a male connector. This orifice 36ca is here located on the upper face 18e of each deflector. FIG. 3 shows that a half of the socket 37 is inserted by male-female fitting in the orifice 36ca and that the other half is inserted by male-female fitting in a female orifice provided at the radially internal end of the body 17a of the pin 17 supported by a pair of fins 14c, 14d. The same figure shows that the inlet 36a is connected by two drill holes 36b1, 36b2 to the outlet 36c. These drill holes are perpendicular, a first 36b1 extending along the axis X, from the inlet 36a, and a second 36b2 extending radially from the first drill hole to the orifice 36ca.

The surfaces 18a, 18b are each connected to the face 18f by a truncated side on which are formed the orifices 36cb for spraying of oil on the gearing zones where the sun gear 7 engages with the planet gears 8. These orifices 36cb are connected by inner ducts 36b4 of the block to the axial drill hole 36b1 (FIGS. 3 and 14). FIG. 15 shows the trajectories 36cb1 of the oil sprays projected by the orifices 36cb of a deflector 18.

One of the deflectors 18 comprises a nozzle 38 configured to project lubricating oil onto the splines 7a of the sun gear 7. This deflector 18 is shown in FIG. 14 and in the center of FIG. 15. The nozzle 38 is formed of a single part with the block of the deflector 18 and has, in this case, a general L-shape, of which one branch 38a has a radial orientation and of which one branch 38b extends axially and connects the front face 18c of the block to the radially external end of the branch 38a. The nozzle 38 extends in a median plane of symmetry of the block. The deflectors 18 that do not comprise a nozzle 38 also have a median plane of symmetry, that corresponds to a plane intersecting with the axis X of the reduction gear 6.

The branch 38a extends radially inwards from the branch 38b and its radially internal free end comprises an orifice 36cc oriented towards the rear for the projection of oil onto the splines 7a. FIG. 17 shows the spray of oil 39 projected by this nozzle 38.

The oil supply of the nozzle 38 is achieved by extending the axial drill hole 36b1 visible in FIG. 3 to the front face 18c of the block of the deflector 18, and in the axial branch 38b (FIG. 14). An additional radial drill hole 36b3 has been provided in the branch 38 to connect this axial drill hole 36b to the orifice 36cc for spraying of oil from the nozzle. The radially external end of the drill hole 36b3 of the nozzle, which is therefore opposite the orifice 36cc for spraying of oil, can be closed by an added plug 36d (FIG. 14). As can be seen in FIG. 3, the deflectors 18 that do not comprise a nozzle 38 have a shorter axial drill hole 36b, i.e. that does not open onto the front face 18c of the block of the deflector.

FIGS. 17 and 18 show that the radially internal peripheral edge 14aa of the front radial wall 14a has notches 40 evenly distributed around the axis X to facilitate the mounting of the deflectors, and of the deflector comprising the nozzle 38. This peripheral edge 14aa is thus generally star-shaped. The number of notches 40 is equal to the number of deflectors 18, and therefore to the number of planet gears 8. The minimum number of notches 40 is equal to the number of nozzles 38, i.e. one in the example shown. However, in order to achieve weight savings and a more regular/even shape, it is advantageous to have the maximum number of planet gears 8 or of deflectors 18. The advantage of having a single notch resides in the need to render fool-proof the assembly so as to make it impossible to mount the deflector-nozzle in one of the five positions for which it is not intended.

FIGS. 19 to 22 show the assembly steps of the reduction gear 6, and of the deflectors 18, of the sun gear 7, of the planet gears 8 and of their axles 10b. A first step consists of arranging the deflectors 18 in the cage 14, the cage already being secured to the cage-carrier 15. The deflectors are inserted, one-by-one, in the cage, through the central orifice of the front wall 14a, and are radially moved outwards, one-by-one, to be positioned so that their tapped holes are aligned with the orifices for the passage of the screws 35 of the rear wall 14b (FIG. 19). It is also possible to mount them by sliding them through the apertures 16. These screws 35 are then screwed and tightened to secure the deflectors 18 to the cage 14 (FIG. 20). The sun gear 7 is then inserted in the cage 14 by an axial translation motion from the rear, through the central orifice of the rear wall 14b (FIG. 20). The planet gears 8 are then inserted, one-by-one, in the cage 14, by a translation motion in the radial direction through the assembly apertures 16 located between the pairs of fins 14c, 14d (FIG. 21). The axles 10b of the planet gears 8 are then inserted in their respective planet gears by an axial translation motion from the upstream section, through the openings provided for that purpose in the front radial wall 14a (FIG. 22). A nut 41 is screwed onto the rear end of each axle 10b and bears axially against the rear wall 14b in order to maintain the axle of the planet gears in the cage 14 (FIGS. 3, 4 and 22).

While illustrative embodiments have been illustrated and described, it will be appreciated that various changes can be made therein without departing from the spirit and scope of the invention.

The embodiments of the invention in which an exclusive property or privilege is claimed are defined as follows:

1. A lubricating and cooling core for a mechanical reduction gear of a turbine engine, the lubricating and cooling core being configured to be mounted in an axle of a planet gear of the mechanical reduction gear, the lubricating and cooling core comprising:
    a first and a second coaxial and substantially frusto-conical shields, each having a first end with a greater diameter and a second opposite end with a smaller diameter, the first and second shields being secured to one another by their second ends and being configured to extend inside the axle of the planet gear and to cover at least a radially internal surface of the axle to define with the radially internal surface at least one annular cavity configured for the circulation of oil for lubricating and cooling the axle, the second ends of the first and second shields having fluid connection means configured to connect the at least one cavity to a source of lubricating and cooling oil.

2. The lubricating and cooling core according to claim 1, wherein each of the first ends and each of the second ends comprise an outer cylindrical centering surface having an annular channel configured to receive a gasket.

3. The lubricating and cooling core according to claim 1, wherein one of the first or second shields comprises an inner chamber centered on an axis Y common to the first and second shields, the inner chamber being connected, on the one hand, by radial passages formed therein or between the first and second shields to the at least one annular cavity, and on the other hand, to a connection pipe centered on the axis Y.

4. The lubricating and cooling core according to claim 3, wherein the pipe is configured to cooperate by a male-female fitting.

5. The lubricating and cooling core according to claim 3, wherein the inner chamber has a generally cylindrical shape centered on the axis Y and comprises a longitudinal end connected to the pipe and an opposite longitudinal end that is either closed, or open and leads into another chamber that is formed in the other of the first or second shield and is connected by other radial passages to the at least one annular cavity.

6. The lubricating and cooling core according to claim 1, wherein the first and second shields are configured to be secured to one another.

7. The lubricating and cooling core according to claim 1, wherein the first and second shields are configured to be secured to one another and to an annular attachment flange of the axle of the planet gear.

8. An axle of a planet gear of a mechanical reduction gear of a turbine engine, the axle comprising:
    a general tubular shape and having substantially radial orifices extending from at least one radially internal surface of the axle to an outer periphery of the axle; and
    a lubricating and cooling core according claim 1 mounted in the axle and covering the at least one surface.

9. The axle of a planet gear according to claim 8, wherein the outer periphery is configured to define at least one rolling track for a bearing.

10. The axle of a planet gear according to claim 8, wherein the inner periphery of the axle is a bi-conical type and comprises two coaxial and frusto-conical surfaces flaring out in opposite directions, the two frusto-conical surfaces being covered by the first and second shields, respectively, and defining with these first and second shields, respectively, at least one annular cavity configured to circulate oil.

* * * * *